United States Patent
Langenfeld et al.

(10) Patent No.: US 8,683,796 B1
(45) Date of Patent: Apr. 1, 2014

(54) VARIABLE DRIVE APPARATUS

(71) Applicant: Hydro-Gear Limited Partnership, Sullivan, IL (US)

(72) Inventors: Thomas J. Langenfeld, Sullivan, IL (US); Shane A. Deters, Mattoon, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 13/776,287

(22) Filed: Feb. 25, 2013

Related U.S. Application Data

(60) Continuation of application No. 13/087,061, filed on Apr. 14, 2011, now Pat. No. 8,381,517, which is a continuation of application No. 12/367,228, filed on Feb. 6, 2009, now Pat. No. 7,926,266, which is a continuation of application No. 11/548,635, filed on Oct. 11, 2006, now Pat. No. 7,487,636, which is a division of application No. 11/126,785, filed on May 11, 2005, now Pat. No. 7,134,276.

(60) Provisional application No. 60/635,658, filed on Dec. 13, 2004, provisional application No. 60/572,163, filed on May 18, 2004.

(51) Int. Cl.
*F16D 31/02* (2006.01)

(52) U.S. Cl.
USPC .......................................................... 60/488

(58) Field of Classification Search
USPC .......................................... 60/453, 487, 488
See application file for complete search history.

(56) References Cited

U.S. PATENT DOCUMENTS

| | | | |
|---|---|---|---|
| 2,330,881 | A | 10/1943 | Gora |
| 4,278,106 | A | 7/1981 | Cunningham |
| 4,365,648 | A | 12/1982 | Grothe |
| 4,633,979 | A | 1/1987 | Edwards |
| 4,845,949 | A | 7/1989 | Shivvers |
| 4,867,008 | A | 9/1989 | Yamaoka et al. |
| 5,163,293 | A | 11/1992 | Azuma et al. |
| 5,311,740 | A | 5/1994 | Shiba et al. |
| 5,314,387 | A | 5/1994 | Hauser et al. |
| 5,339,631 | A | 8/1994 | Ohashi |
| 5,353,834 | A | 10/1994 | Schmitt et al. |
| 5,794,443 | A | 8/1998 | Shimizu |
| 5,799,486 | A | 9/1998 | Takada et al. |
| 6,122,996 | A | 9/2000 | Hauser et al. |
| 6,185,936 | B1 | 2/2001 | Hauser et al. |
| 6,192,682 | B1 * | 2/2001 | Smothers et al. ............... 60/488 |

(Continued)

FOREIGN PATENT DOCUMENTS

JP 2000-009023 1/2000

*Primary Examiner* — Michael Leslie
(74) *Attorney, Agent, or Firm* — Neal, Gerber & Eisenberg LLP

(57) ABSTRACT

A drive apparatus is provided with a center section in a housing and having a hydraulic circuit formed therein with pump and motor running surfaces for connecting a hydraulic pump to a hydraulic motor. A pair of cylindrical openings may be formed on the center section opposite the pump running surface, and a passage in the center section connects the pair of cylindrical openings to form a fluid gallery to provide hydraulic fluid to the hydraulic circuit through a pair of check valves. A pair of caps on the center section to close off the fluid gallery, and an external charge pump to provide charged fluid to the fluid gallery, may also be provided.

25 Claims, 40 Drawing Sheets

(56) References Cited

U.S. PATENT DOCUMENTS

| | | |
|---|---|---|
| 6,212,887 B1 | 4/2001 | Takada |
| 6,223,531 B1 * | 5/2001 | Hauser et al. ............ 60/487 |
| 6,370,876 B1 | 4/2002 | Langenfeld |
| 6,374,604 B1 | 4/2002 | Poplawski et al. |
| 6,681,569 B1 | 1/2004 | Phanco et al. |
| 6,775,976 B1 | 8/2004 | Phanco et al. |
| 6,811,509 B1 | 11/2004 | Langenfeld |
| 6,843,056 B1 * | 1/2005 | Langenfeld et al. ............ 60/488 |
| 7,028,708 B1 | 4/2006 | Langenfeld et al. |
| 7,047,736 B1 | 5/2006 | Langenfeld et al. |
| 7,096,884 B2 | 8/2006 | Mackal |
| 7,111,457 B1 | 9/2006 | Langenfeld et al. |
| 7,134,276 B1 | 11/2006 | Langenfeld et al. |
| 7,234,300 B1 | 6/2007 | Langenfeld et al. |
| 7,487,636 B1 | 2/2009 | Wigness et al. |

* cited by examiner

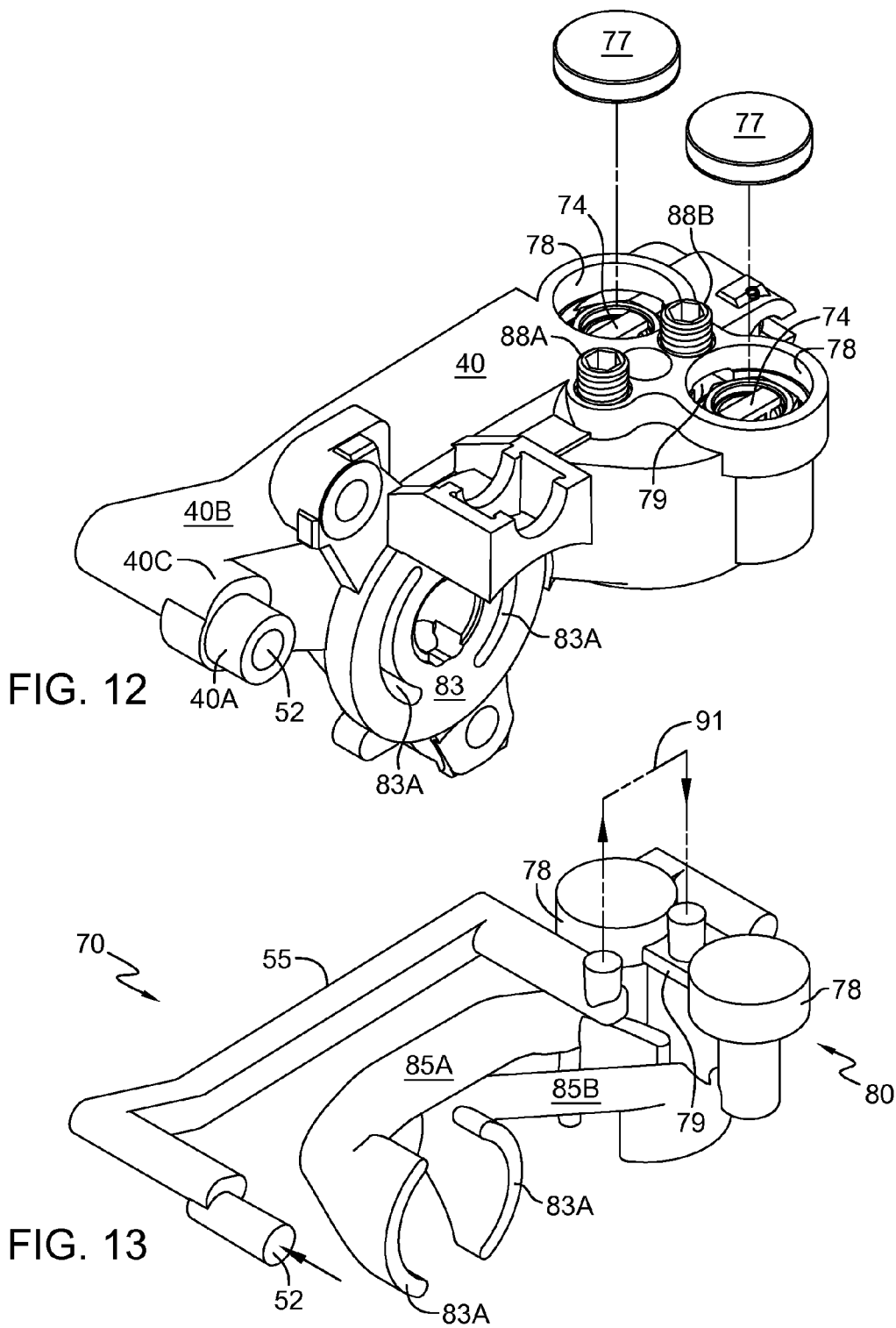

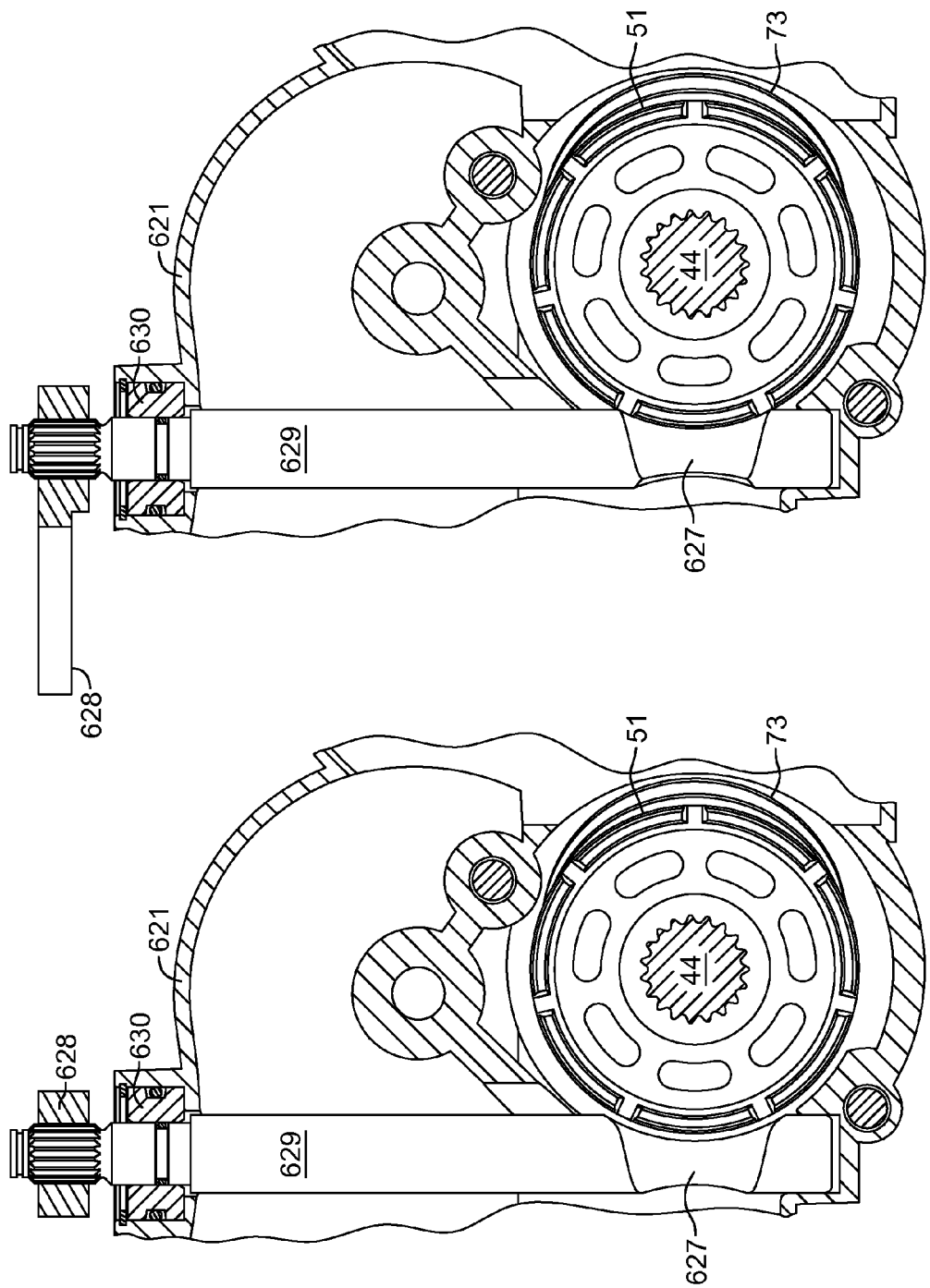

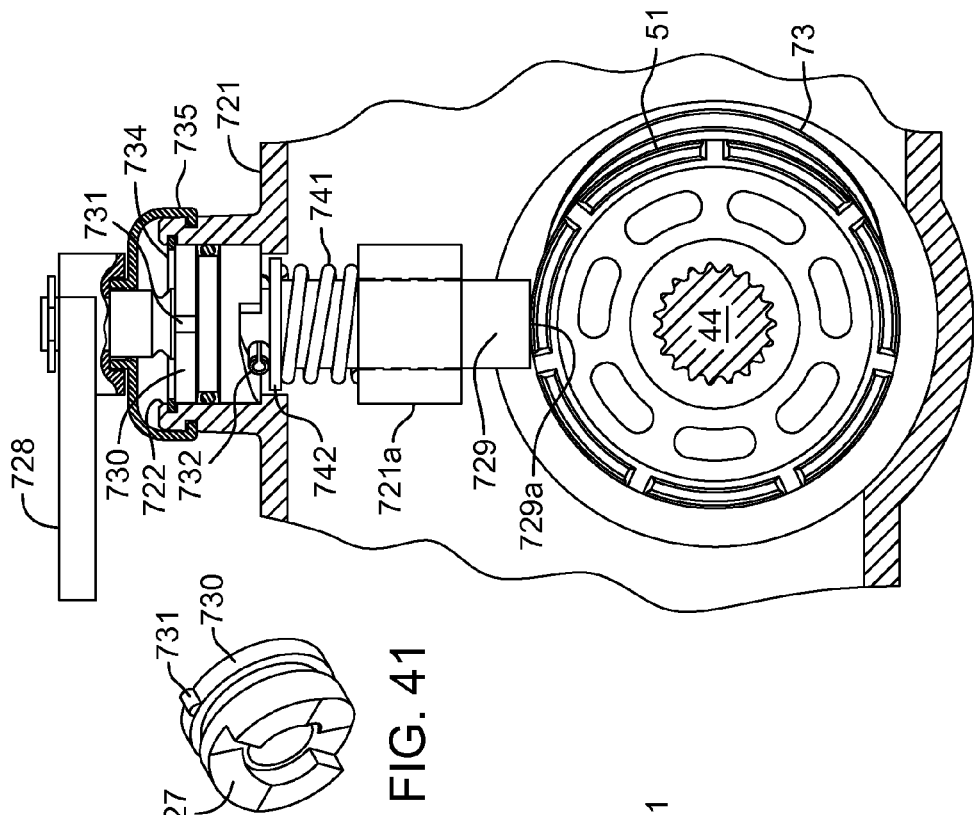
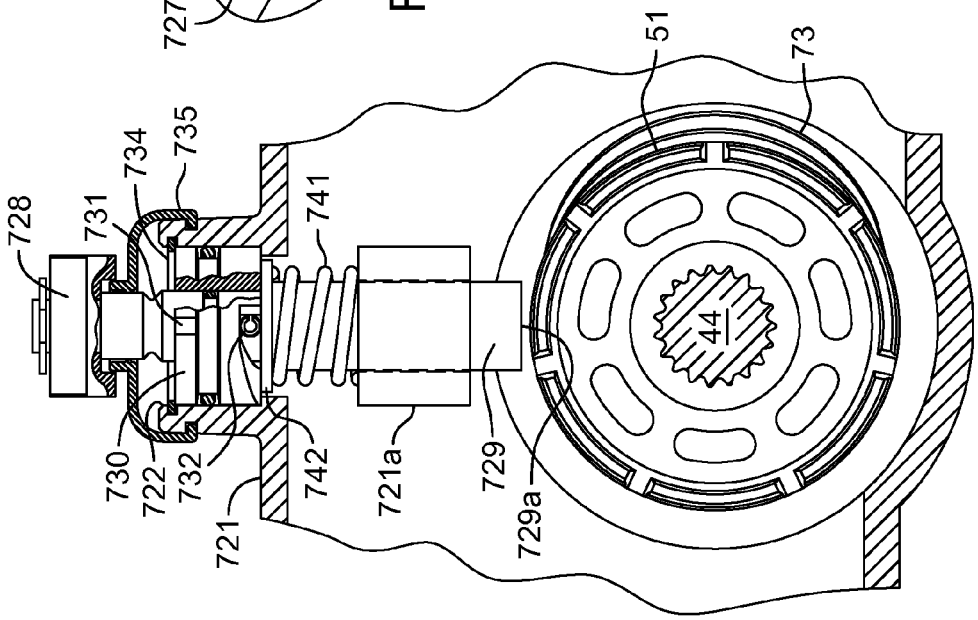

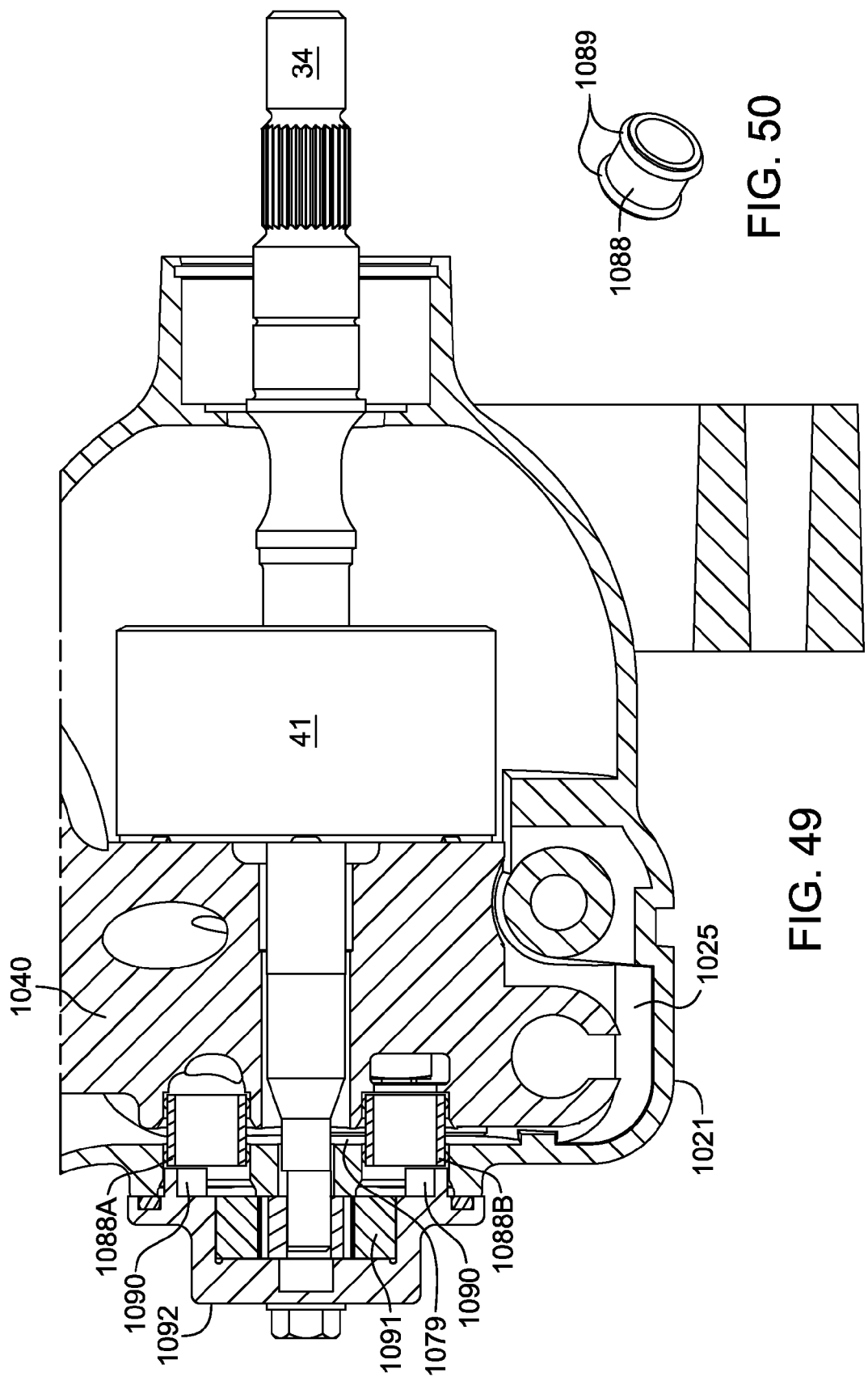

VARIABLE DRIVE APPARATUS

CROSS-REFERENCE

This application is a continuation of U.S. application Ser. No. 13/087,061 filed on Apr. 14, 2011, which is a continuation of U.S. application Ser. No. 12/367,228 filed on Feb. 6, 2009, now U.S. Pat. No. 7,926,266, which is a continuation of Ser. No. 11/548,635 filed on Oct. 11, 2006, now U.S. Pat. No. 7,487,636, which is a divisional of U.S. application Ser. No. 11/126,785 filed on May 11, 2005, now U.S. Pat. No. 7,134,276, which claims priority from Provisional U.S. App. Ser. No. 60/635,658 filed Dec. 13, 2004 and Provisional U.S. App. Ser. No. 60/572,163 filed May 18, 2004. These applications are incorporated herein by reference in their entirety.

BACKGROUND OF THE INVENTION

This invention relates to hydrostatic transaxles generally and, in particular, transaxles intended for use in zero turn vehicles and similar applications.

SUMMARY OF THE INVENTION

A cylinder block brake mechanism for a hydrostatic transmission or transaxle is disclosed herein. Additional features and benefits of an improved zero turn transaxle are also disclosed herein.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 12 is a bottom perspective view of the center section in accordance with the first embodiment of this invention.

FIG. 13 is a stylized view of the internal porting of the center section shown in FIG. 12.

FIG. 36 is a cross-sectional side view of the braking mechanism of the transaxle in the disengaged position, along the lines 36-36 of FIG. 35.

FIG. 37 is a cross-sectional side view identical to FIG. 36 but with the braking mechanism in the engaged, or actuated position.

FIG. 39 is a cross-sectional side view along the lines 39-39 in FIG. 38, with the brake mechanism in the disengaged position.

FIG. 40 is a cross-sectional side view identical to FIG. 39 but with the brake mechanism in the engaged position.

FIG. 41 is a perspective side view of a portion of the braking mechanism shown in FIGS. 39 and 40.

FIG. 49 is a view similar to FIG. 20 of an alternative embodiment of a feature of the invention.

FIG. 50 is a perspective view of the connecting tubes shown in FIG. 49.

DETAILED DESCRIPTION OF THE INVENTION

Figure 1:
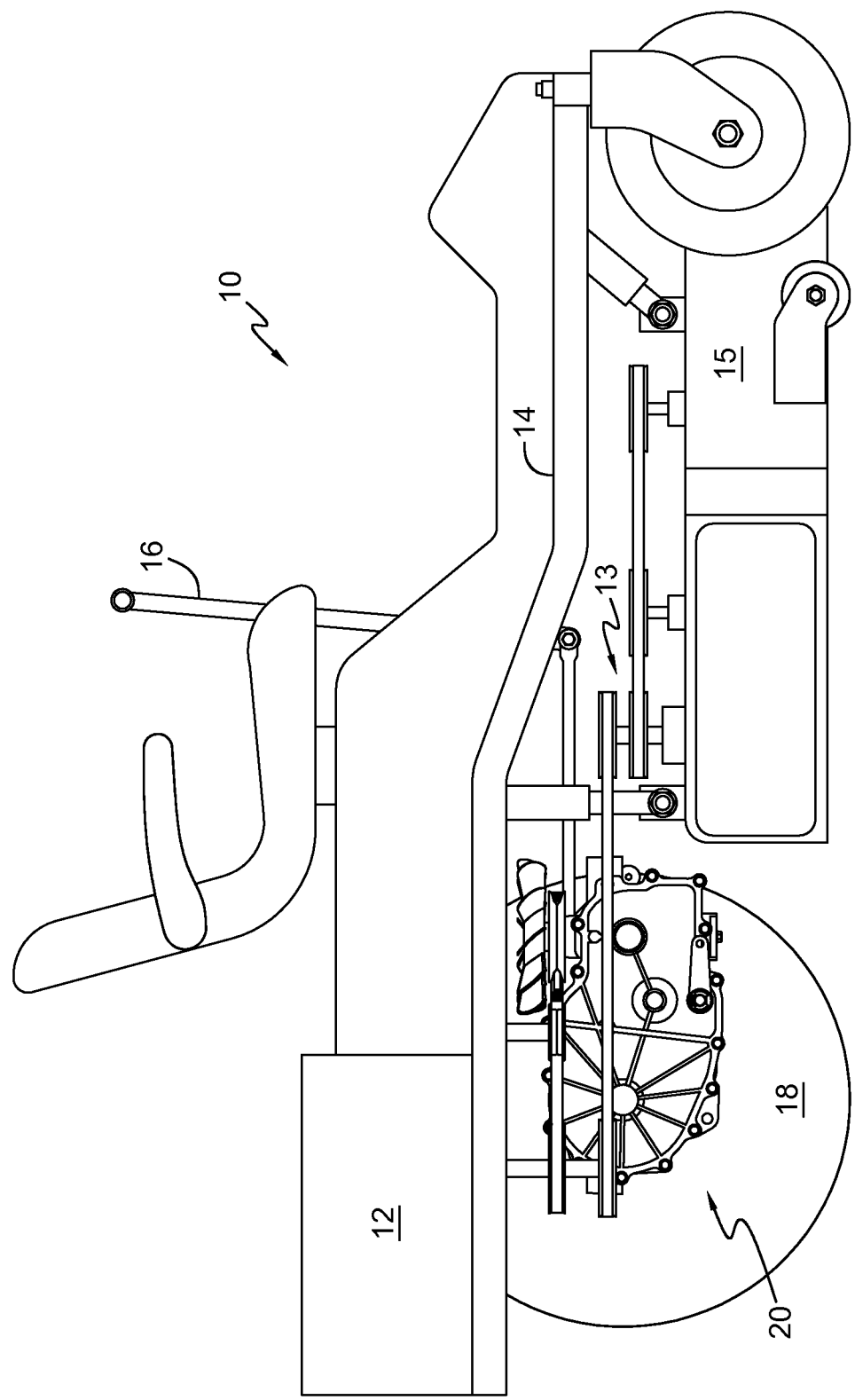
FIG. 1 is a side elevational view of an exemplary vehicle in accordance with the subject invention with one rear wheel and one drive apparatus removed for clarity.

This invention is described herein with respect to exemplary vehicle 10, which is shown in FIG. 1 with one rear wheel and one driving unit removed for clarity. It will be understood that other vehicles and applications can be used in accordance with the present invention. Various alternative embodiments of different features or components of a zero turn transaxle are depicted herein. For the sake of simplicity, like numerals are used to describe identical or substantially identical components where appropriate.

Hydrostatic transaxles are well-known in the art, and the internal functioning of the various components, such as the pump, motor, hydraulic porting and the like are described in U.S. Pat. Nos. 5,314,387 and 6,185,936, which are commonly owned with this application and which are incorporated herein by reference.

In general, vehicle 10 includes a prime mover or engine 12 and a pair of transaxles 20 mounted on frame 14 and having a pair of driven wheels 18. Such vehicles generally include a driven apparatus such as mower deck 15, which is connected to engine 12 through a belt and pulley assembly 13. There generally will be two user controls 16 which are connected to the respective transaxles 20 to control the output speed and direction thereof. It will be understood that there will be additional linkages and the like, such as engine controls and brake linkages, which are not depicted herein for the sake of simplicity.

Figure 2:
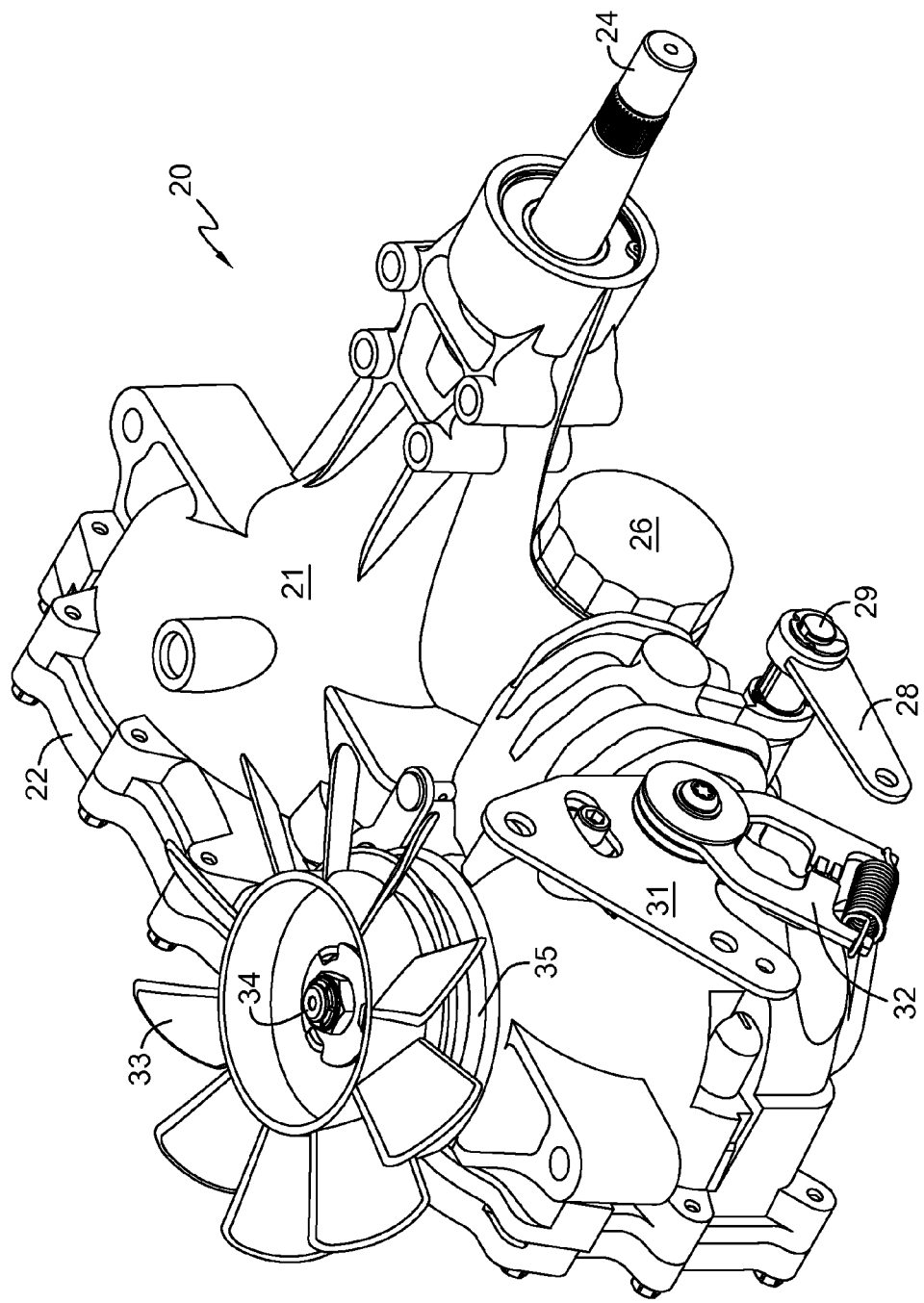
FIG. 2 is a perspective view of an exemplary hydrostatic transmission in accordance with the subject invention.
Figure 3:
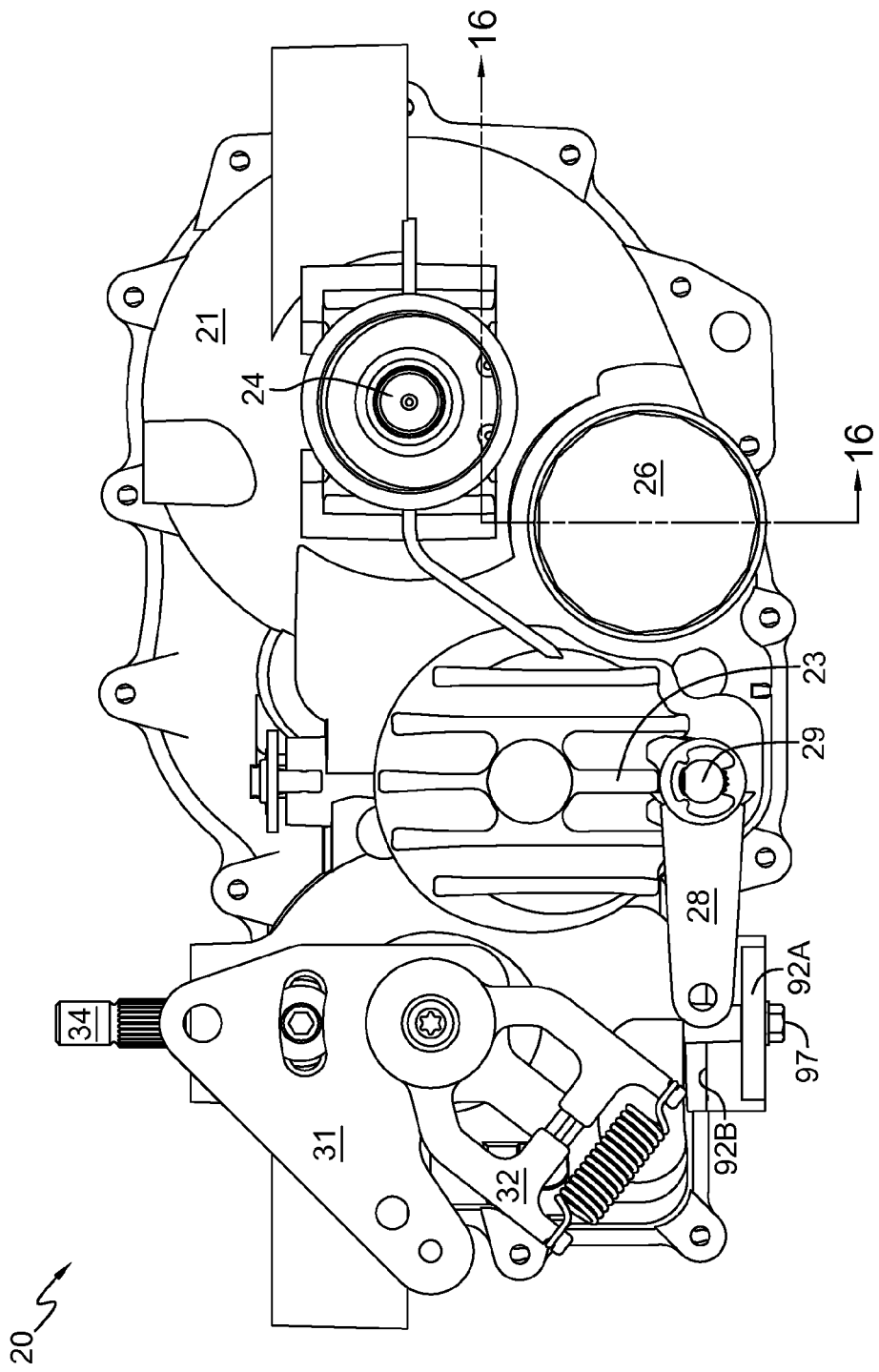
FIG. 3 is a side elevational view of the transaxle shown in FIG. 2.
Figure 4:
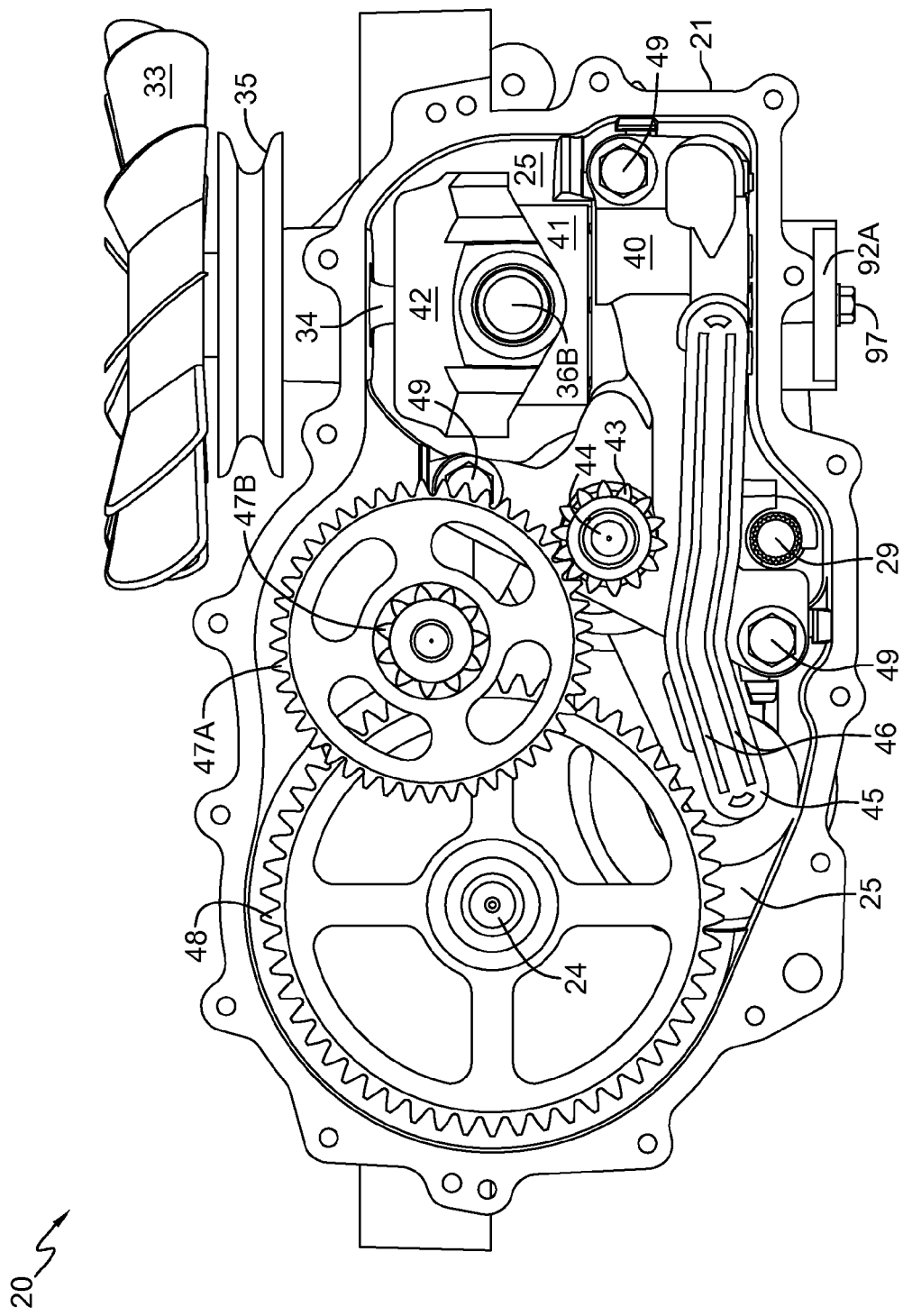
FIG. 4 is the opposite side elevational view of the transaxle shown in FIG. 2, with one housing cover removed to show the internal structure of the unit.

A first embodiment of trans-axle 20 is shown in, FIGS. 2-5. A main housing 21 is joined to housing cover member or side housing 22 along a split line perpendicular to output axle 24 to form an oil sump 25. An optional fan 33 is shown in FIGS. 2 and 4 as attached to input shaft 34; fan 33 and pulley 35 are not shown in FIGS. 3 and 5 for clarity. In the usual vehicle arrangement, two such transaxles 20 would be used, and each would be a mirror image of the other.

Figure 10:
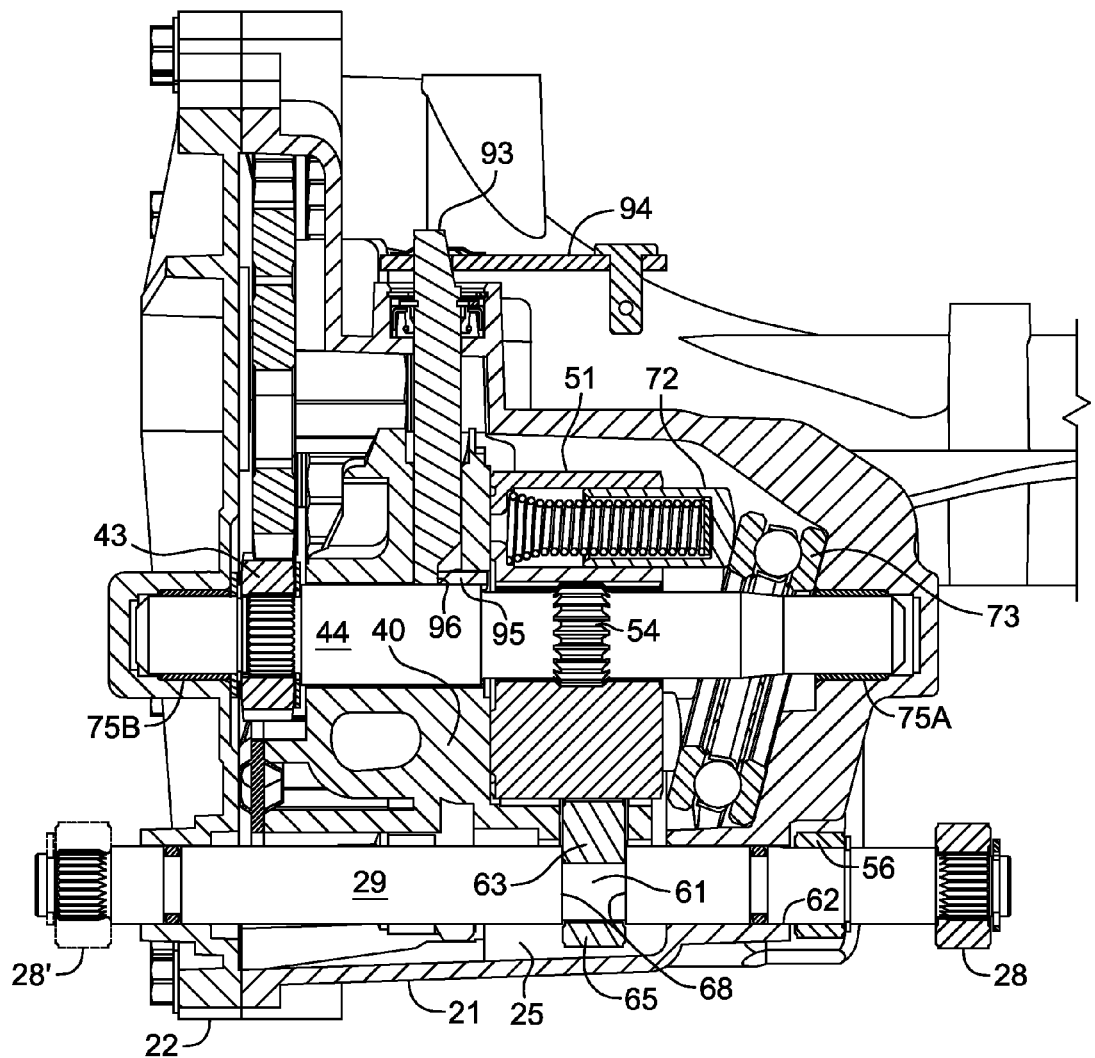
FIG. 10 is a cross-sectional view of the transaxle of FIG. 2 along the lines 10-10 in FIG. 5.
Figure 15:
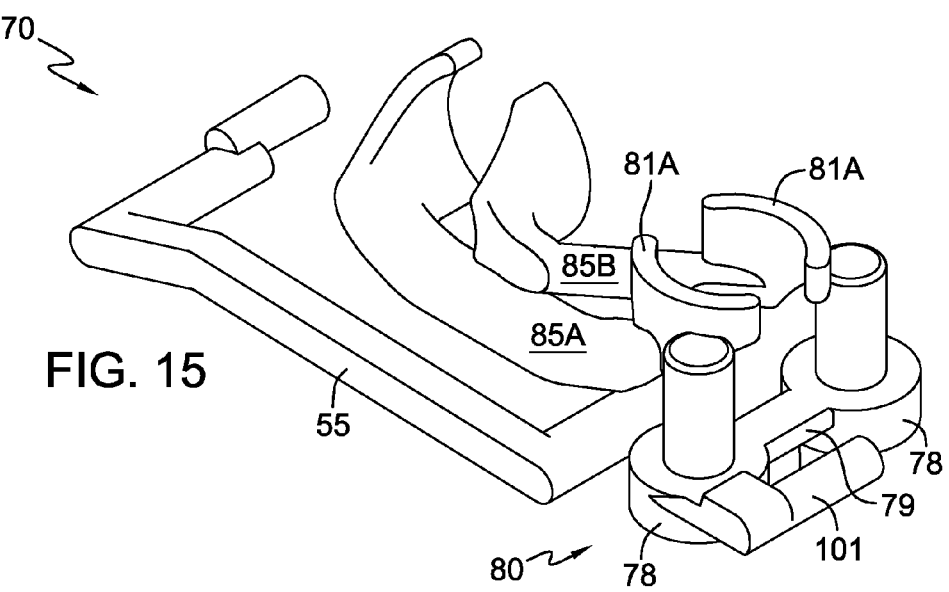
FIG. 15 is a stylized view of the internal porting shown in FIG. 13 shown from the same angle as FIG. 14.

FIG. 4 shows an internal view of transaxle 20. Center section 40 is preferably secured to main housing 21 through a plurality of fasteners 49. As is known in the art, input shaft 34, which is driven by pulley 35, drives rotatable pump cylinder block 41, which includes a plurality of axial pistons (not shown). Since axial piston pumps and motors are well known in the art, the pistons for both pump cylinder block 41 and motor cylinder block 51 are generally not shown in detail in these figures. An exemplary motor piston 72 is shown in FIG. 10 engaged to thrust bearing 73. As is known in the art, motor thrust bearing 73 can be supported entirely within housing 21 at a fixed angle. The pump pistons (not shown) abut moveable swash plate 42, which is connected to control arm 31 through trunnion shaft 36A, shown in phantom in FIG. 5, to control the direction and output of the unit. It will be understood that trunnion 36A could extend through side housing 22 and control arm 31 could then be attached thereto. A return to neutral feature 32 can optionally be mounted on transaxle 20. Pump cylinder block 41 is connected to motor cylinder block 51 through hydraulic porting 70 as shown in FIGS. 13 and 15 and described below. Hydraulic porting 70 connects pump block 41, motor block 51 and other hydraulic elements and thus may also be considered a hydraulic circuit.

Motor output shaft 44 is driven by motor cylinder block 51 and has a gear 43 engaged thereto. A gear train comprising gear 43, intermediate gears 47A and 47B and output gear 48 transfer rotational force from motor output shaft 44 to output axle shaft 24.

Another unique feature of this invention is that motor shaft 44 is not supported by and does not contact center section 40, as can be seen in FIG. 10. Instead, a pair of bearings 75A and 75B located in housings 21 and 22, respectively, fully support motor shaft 44. Spline 54 is used to engage a corresponding internal spline on cylinder block 51.

Figure 5:
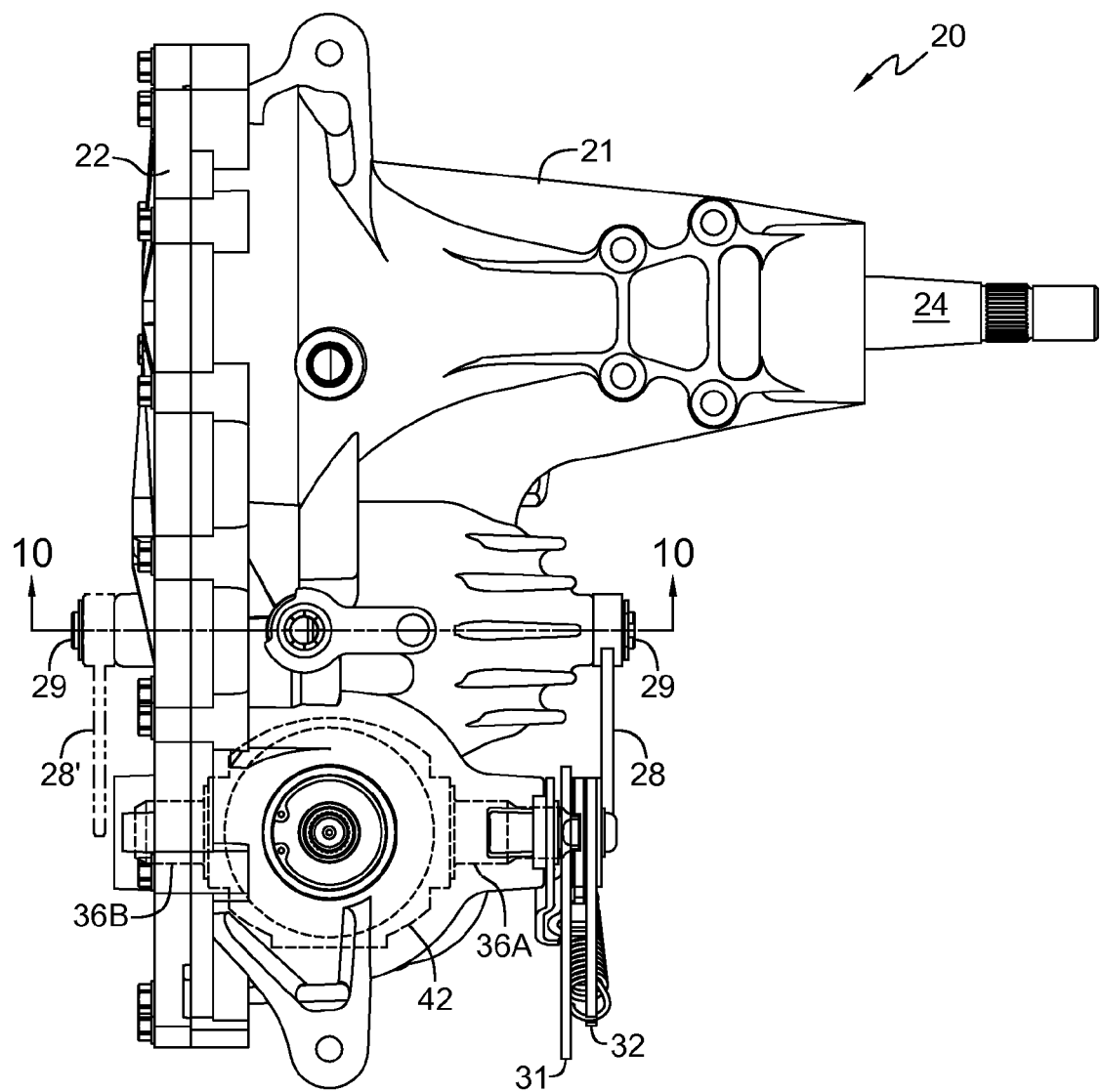
FIG. 5 is a top plan view of the transaxle shown in FIG. 2.

This invention includes a unique brake apparatus that applies a braking force to the motor cylinder block 51. A first embodiment can be seen in FIGS. 5 and 10, where cam shaft 29 extends out of both sides of transaxle 20 (i.e., out both main housing 21 and side housing 22). A brake arm 28 is shown in FIGS. 5 and 10 engaged to the end of cam shaft 29 on the outboard side of transaxle 20. This arrangement is also depicted in the exploded view of FIG. 6. It is also possible to mount the actuation arm in the location depicted as 28' in FIGS. 5 and 10 on the inboard side of transaxle 20. This gives the user assembling transaxle 20 in a vehicle additional flexibility in the location of the brake linkage (not shown) by using the existing features of shaft 29. Note that cam shaft 29 may extend from only main housing 21 or side housing 22.

The operation of the brake assembly can be seen in FIGS. 6-10. For purposes of clarity, the cross-sectioning in the figures is not always consistent. For example, in FIGS. 8 and 9, cam shaft 29, portions of center section 40, and puck 63 are cross-sectioned, while cam shaft 29 and motor shaft 44 are shown as solid in FIG. 10. Cam shaft 29 is inserted into opening 62 in housing 21 and extends through the housing as described above. A stop 56 having inner tab 56A is mounted on groove 59 on cam shaft 29. Stop 56B contacts rib 23 formed on housing 21 to limit the rotation of cam shaft 29.

Figure 6:
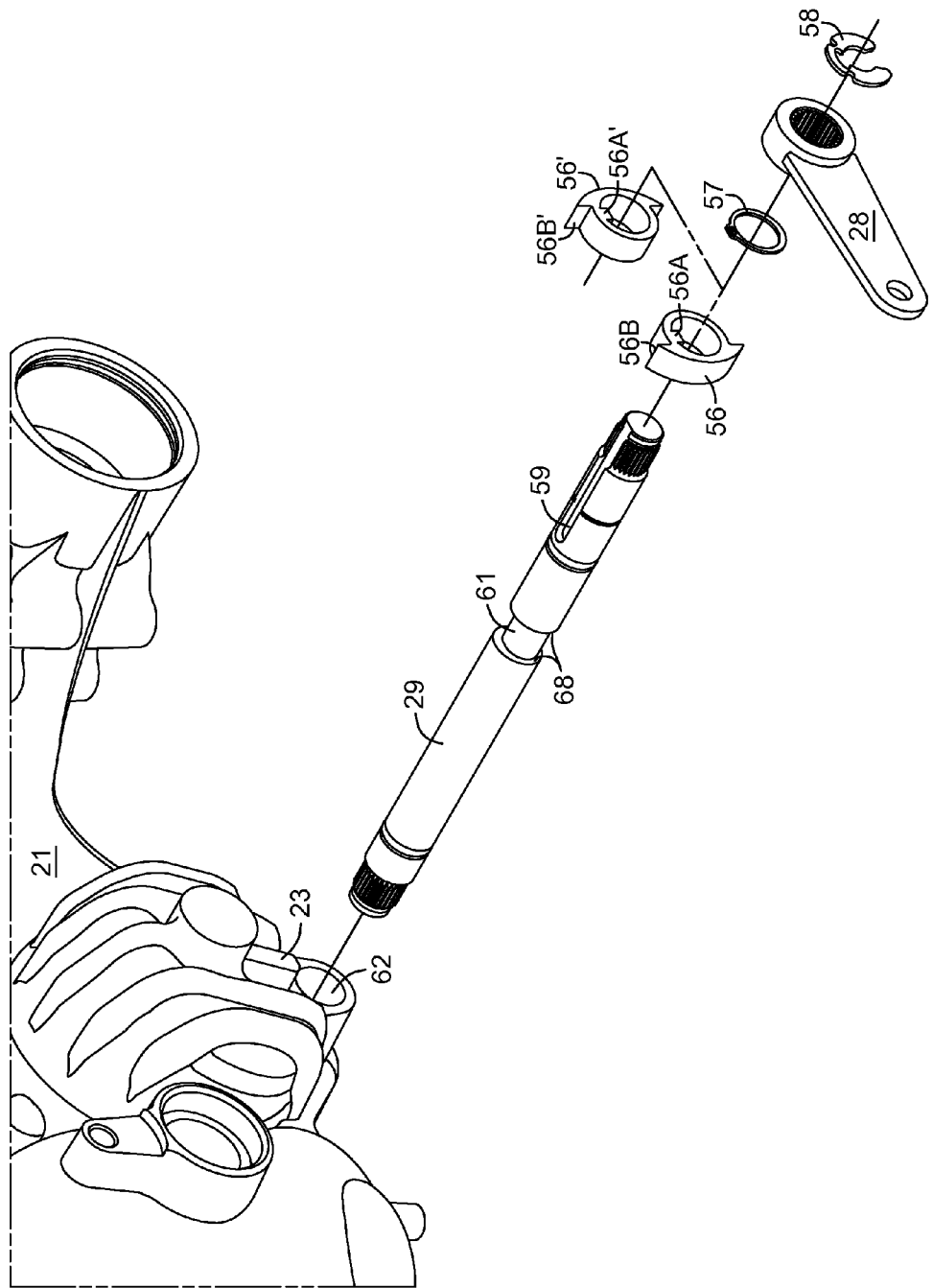
FIG. 6 is an exploded perspective view of components of a first embodiment of a cam mechanism of the subject invention.
Figure 7:
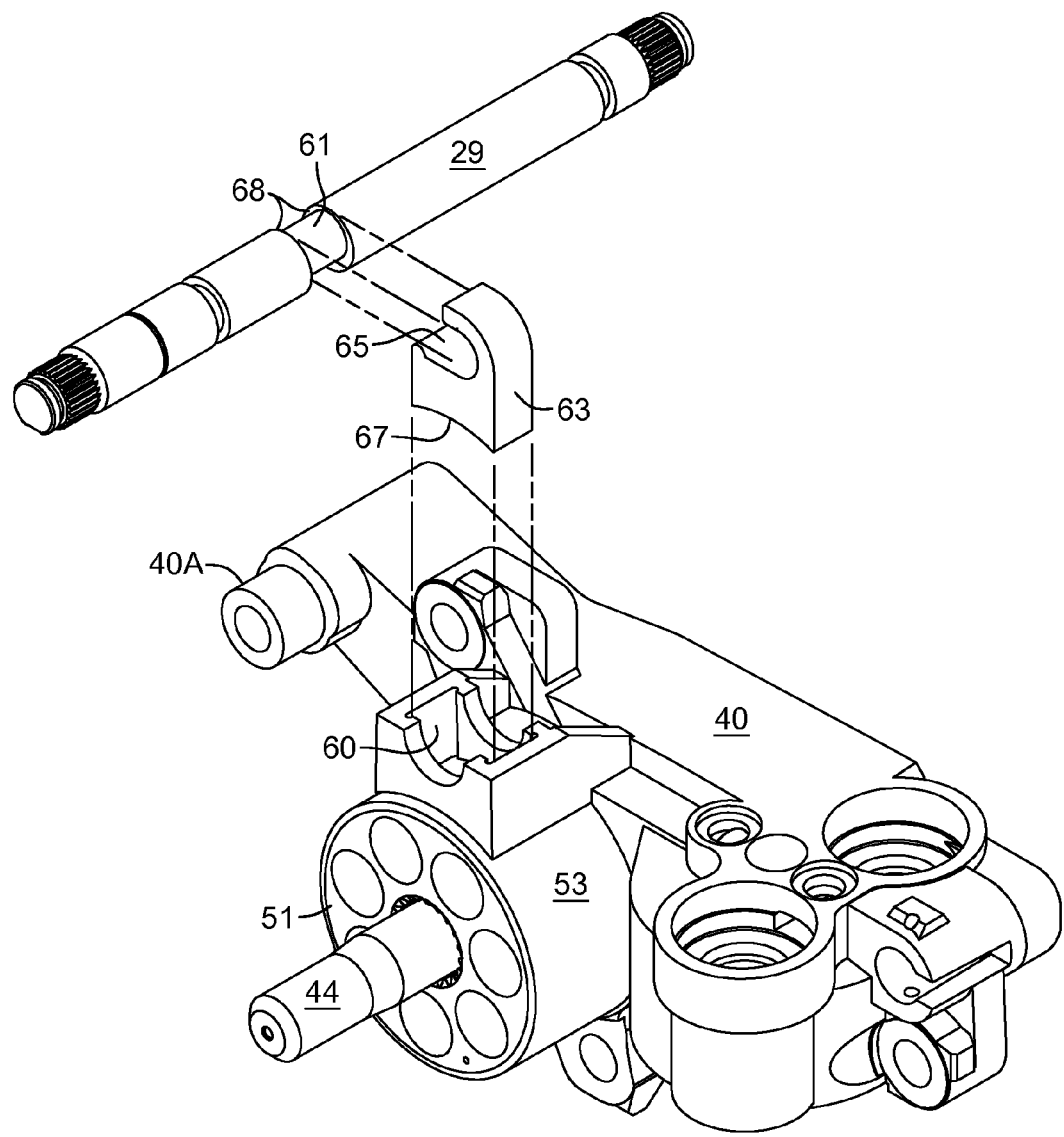
FIG. 7 is an exploded perspective view of a center section and certain components of the cam mechanism for use in the first embodiment of the subject invention.
Figure 8:
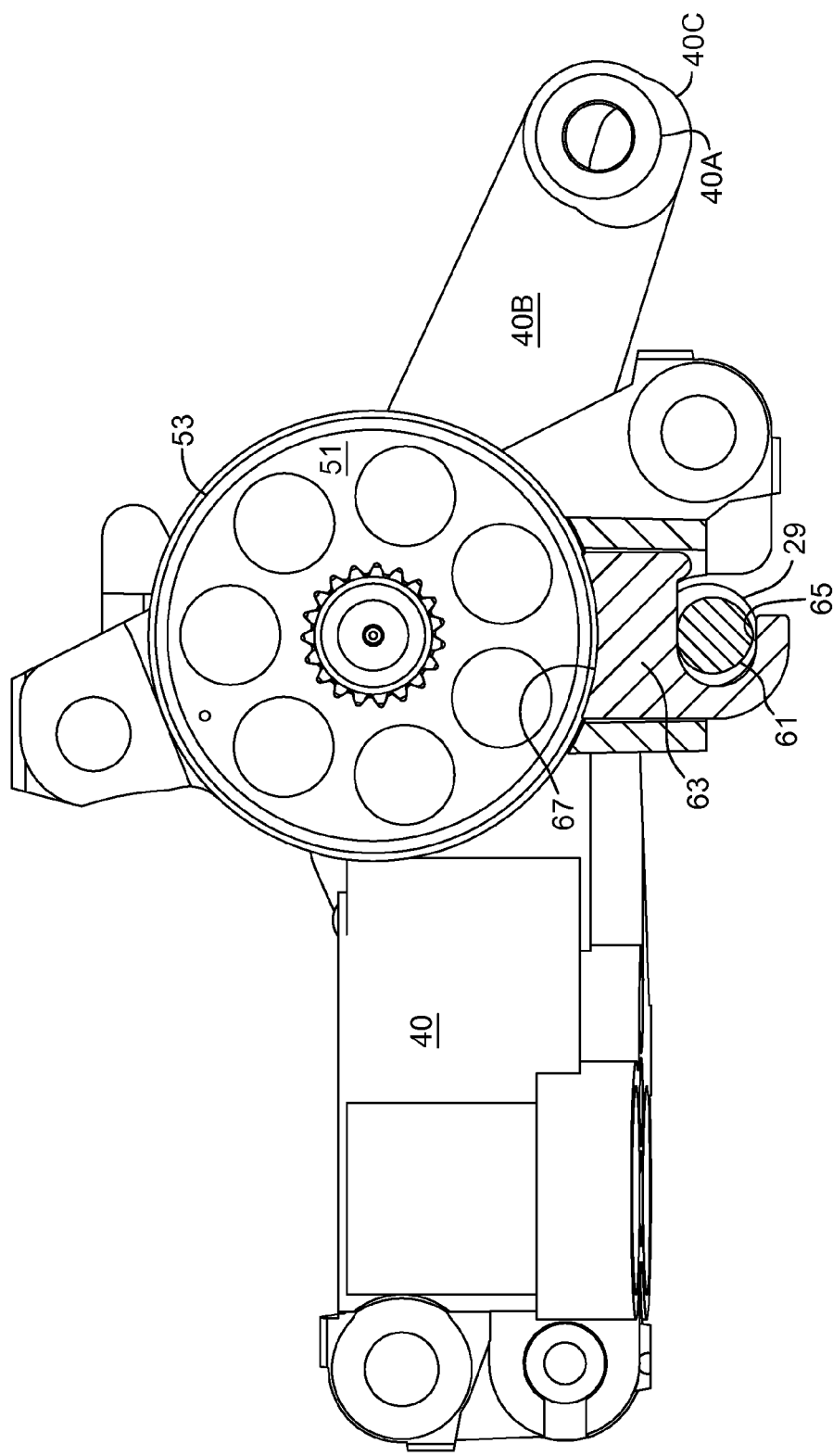
FIG. 8 is a side elevational view of a center section including a motor cylinder block of the first embodiment of the subject invention, with the brake disengaged and various components removed and other components cross-sectioned for clarity.
Figure 9:
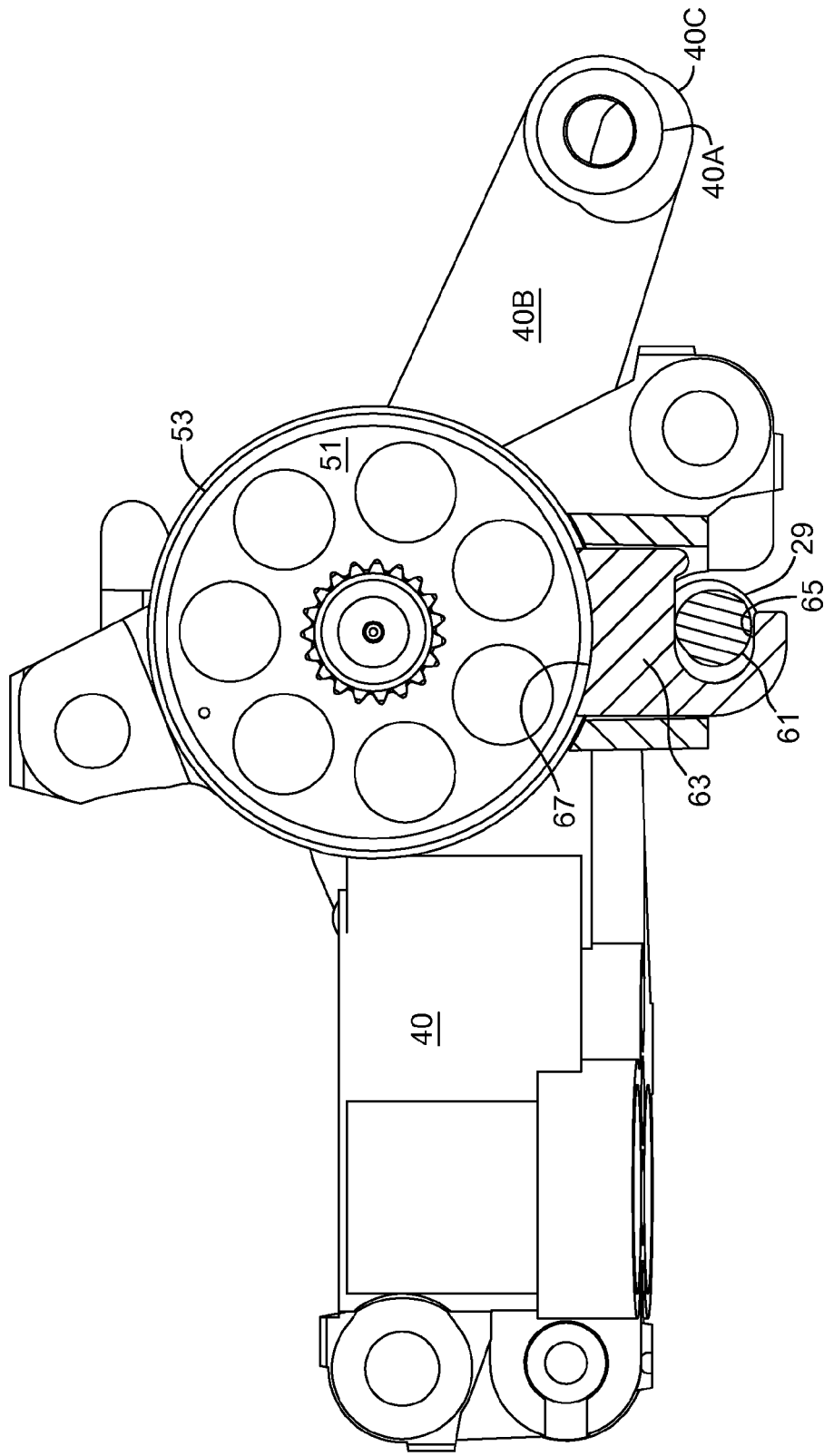
FIG. 9 is a side elevational view of a center section including a motor cylinder block of the first embodiment of the subject invention, with the brake engaged or actuated and various components removed and other components cross-sectioned for clarity.

An alternative orientation stop 56' having inner tab 56A' and stop 56B' is also depicted in FIG. 6. Which tab orientation is used will depend on the preferred direction of actuation of cam shaft 29, again increasing the flexibility of the unit for the person mounting transaxle 20 on vehicle 10. Stop 56 is held on cam shaft 29 by means of retaining ring 57 and brake arm 28 is retained by means of retaining ring 58. In the event the user wishes to mount brake arm 28' on the inbound side of transaxle 20 as shown in FIG. 5, retaining ring 57 would still be used to locate and retain stop 56 (or the stop 56' orientation) on the outboard side of transaxle 20.

A cam 61 is formed on cam shaft 29. Puck 63 is slidably mounted in a pocket 60 formed in center section 40. Puck 63 comprises a braking surface 67 that may be brought into contact with external radial surface 53 of pump cylinder block 51. As cam shaft 29 is rotated cam 61 engaged to puck 63 forces puck 63 to move from the disengaged position, shown in FIG. 8 toward surface 53 to engaged surface 53. Shaft 29 may then be rotated in an opposite direction to disengage puck 63 from contact with surface 53. Puck 63 further comprises c-clip portion 65 that is engaged to cam 61, whereby rotation of cam shaft 29 to move puck 63 from the engaged position shown in FIG. 9 to the disengaged position causes puck 63 to move perpendicularly away from cylinder block surface 53. It is preferred that the line of action of puck 63 is through spline 54 on motor shaft 44 in order to minimize the possibility of tipping cylinder block 51. This line of action need not, however, be in the center of spline 54.

As can be seen in FIG. 10, shoulders 68 on cam shaft 29 interact with puck 63, especially c-clip portion 65, to retain cam shaft 29 inside transaxle 20. This structure eliminates the need for additional means for retaining shaft 29 in the axial direction. However, it is envisioned that shaft 29 could be retained by other known means. Also, puck 63 may be biased to the disengaged position by other known means, such as springs. In the event that shaft 29 is retained by other means and puck 63 is biased to the disengaged position by some other method c-clip portion 65 may be eliminated.

Figure 53:
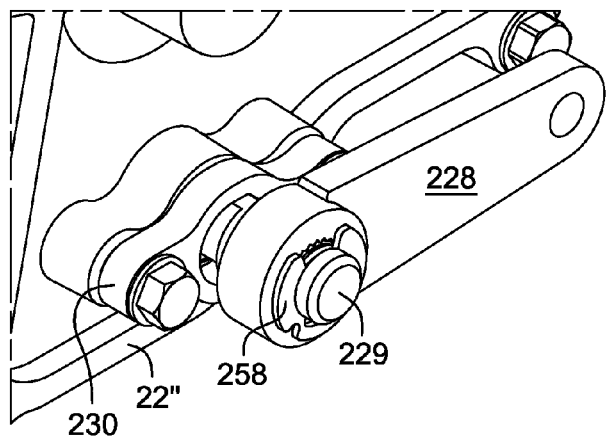
FIG. 53 is a partial perspective view of a cam arm in accordance with an alternative embodiment of this invention.
Figure 54:
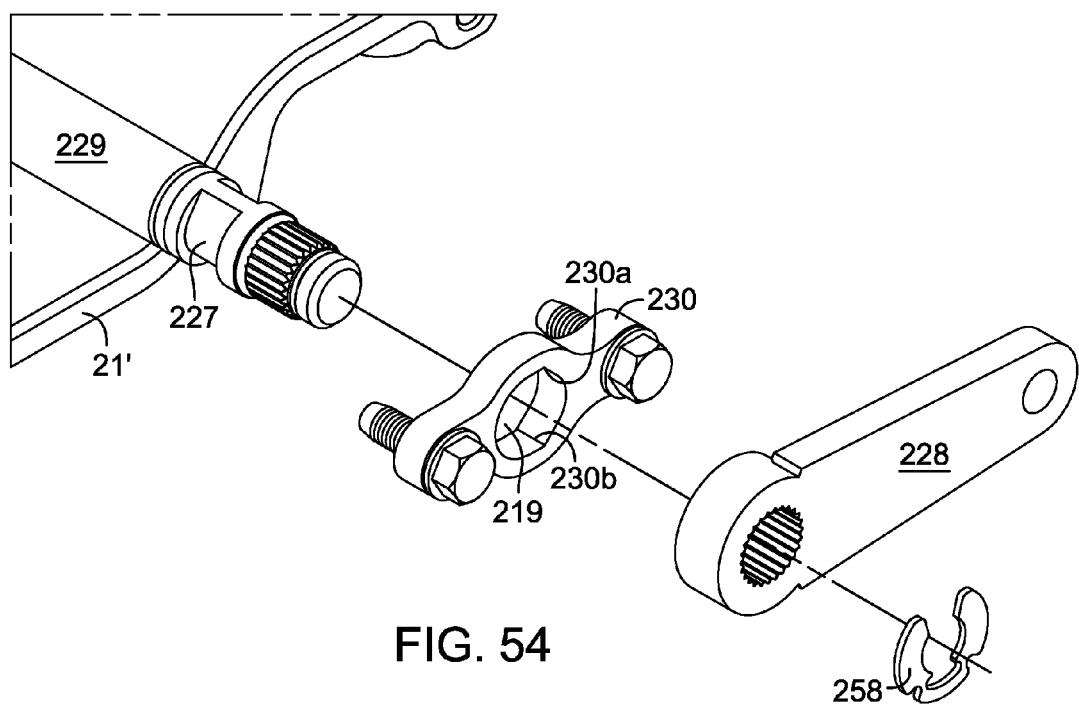
FIG. 54 is an exploded view of the brake shaft and brake arm assembly of FIG. 53, with the side housing removed for clarity.

An alternative cam shaft 229 having an external, tear-drop shaped cam 227 formed thereon is shown in FIGS. 53 and 54. It will be understood that cam shaft 229 may extend through housing member 21' or 22" and that cam 227 may be mounted on either side of transaxle 20 (i.e., outboard or inboard). External cam 227 is located outside housing member 21' (or 22") and engaged to cam stop bracket 230, that may be bolted to housing member 21' or (22"). Cam stop bracket 230 has two stops 230a and 230b formed in an opening 219. Brake arm 228 is secured to cam shaft 229 by retaining ring 258 and rotates cam shaft 229 in either direction. The interaction of cam 227 against stops 230a and 230b limits the range of motion of the cam shaft 229. In both FIGS. 53 and 54, cam 227 is at stop 230a.

Several alternative embodiments of a cylinder block braking mechanism are depicted in FIGS. 33-48; again, like numerals are generally used to indicate structure that is identical or substantially identical to that described previously. In each embodiment, a force is applied by a cam shaft to the rotary cylinder block of the hydraulic motor in order to provide braking for the unit.

The second embodiment of this cylinder block brake is shown in FIGS. 33-37, where cam shaft 629 is mounted in housing 621; cam shaft 629 is preferably parallel to input shaft 34 and perpendicular to motor shaft 44 and the axis of rotation of motor cylinder block 51, which is mounted on center section 640 inside housing 621 similar to that described above. While the preferred arrangement of cam shaft 629 for this transaxle configuration is as described, in general the preferred geometry is for cam shaft 629 to extend tangentially to external surface 53 of cylinder block 51. Brake arm 628 is mounted to one end of cam shaft 629 external to housing 621 to rotate shaft 629 as described herein. A bushing 630 acts to hold shaft 629 in housing 621, and various o-rings and the like may be used to provide appropriate sealing.

A cam portion 627 is formed on cam shaft 629 and is located inside housing 621. Cam shaft 629 is movable between the disengaged position shown in FIG. 36, where cam 627 does not contact motor cylinder block 51 to the engaged or actuated position shown in FIG. 37, where cam 627 has been rotated to cause it to engage external surface 53 of motor cylinder block 51 to provide a frictional braking force thereto. While the necessary rotation to cause engagement is shown in these figures to be approximately 90 degrees, it will be understood that this can be modified depending on the shape of the cam, and factors such as descried tolerances will affect this determination. Cam 627 may force cam shaft 629 to move with respect to cylinder block 51 when the brake is engaged as cam 627 attempts to mate with external surface 53 of cylinder block 51. Thus, there will preferably be sufficient clearance between shaft 629 and housing 621, and shaft 629, bushing 630 and any retaining elements adjacent to bushing 630 to allow such movement of shaft 629. This alternative design is simpler and less expensive to implement as it has fewer moving parts.

A third alternative design of the brake mechanism is shown in FIGS. 38-41, where cam shaft 729 is again mounted in housing 721, preferably perpendicular to motor output shaft 44 and parallel to the pump input shaft 34. As in the previous embodiment, while this orientation of shaft 729 is preferred for this the transaxle configuration shown, the primary requirement is for shaft 729 to be as normal to surface 53 of cylinder block 51 as possible.

In this embodiment, cam shaft 729 is moveable in the vertical direction between the disengaged position shown in FIG. 39 and the engaged position shown in FIG. 40. This movement is accomplished by means of bushing 730 mounted in opening 722 and pin 732 engaged to shaft 729. A cam face 727 is formed on one surface of bushing 730, and anti-rotation tabs 731 prevent bushing 730 from rotating with respect to housing 721, as shown most clearly in FIG. 41. Pin 732 is secured to or formed on shaft 729 adjacent to cam surface 727. When arm 728 is rotated from the position in FIG. 39 to the position in FIG. 40, pin 732 is moved against cam surface 727 to force shaft 729 to move downwardly. A contact surface 729a is formed on the bottom of brake shaft 729, and as shaft 729 moves downward, surface 729a comes into contact with external surface 53 of cylinder block 51 to provide a braking force to cylinder block 51, thus braking the unit.

Housing member 721a is formed on an inner surface of housing 721 to provide support for shaft 729. Member 721a may be formed as a boss or similar structure on the inner housing surface. Return spring 741 and washer 742 are located between housing member 721a and bushing 730 on cam shaft 729; spring 741 and washer 742 act against the bottom of pin 732 to provide a return force so that cam shaft 729 is biased in the disengaged position.

Bushing 730 is held within housing 721 by means of a retaining ring 734 and a dust cover 735 may be placed over opening 722 to protect the brake assembly from contamination. Additional o-rings and the like are similarly used to seal the unit as needed.

Yet another cylinder block brake embodiment is shown in FIGS. 42-45, which is structurally similar to that described above. The cam shaft in the embodiment is comprised of a first member 829a and second member 829b. First member 829a is attached at one end to brake arm 828 and terminates at the opposite end in a first cam member 827a. Second member 829b has one end terminating in curved braking surface 829c and the other end terminating in cam member 827b. The two cam members 827a and 827b cooperate so that when brake arm 828 and upper shaft member 829a are rotated from the position in FIG. 43 to the position in FIG. 44, lower cam member 827b and consequently lower shaft member 829b are forced downward to the engaged position, so that braking surface 829c contacts external surface 53 of cylinder block 51 to provide a braking force thereto.

Cam 827 is located adjacent to a passage 831 formed inside housing 821. Passage 831 provides room for hydraulic fluid to move in and out of the area of cam 827 to promote free movement of second member 829b. Without such a passage, hydraulic fluid would have resistance to moving between cams 827a and 827b when the brake is disengaged, diminishing the ease of operation of the brake.

A housing member 821a is used to provide support for lower shaft 829b, and a screw 823 is threaded into housing member 821a and cooperates with a slot 824 formed in lower shaft member 829b to permit translational movement while preventing rotation of lower shaft member 829b. A bushing 830 is used with various seals, retaining elements or the like to retain shaft 829a in housing 821. Spring 841 may be mounted as shown to provide a return force to the lower cam member 827b so that the brake assembly is biased towards the disengaged position shown in FIG. 43.

Figure 46:
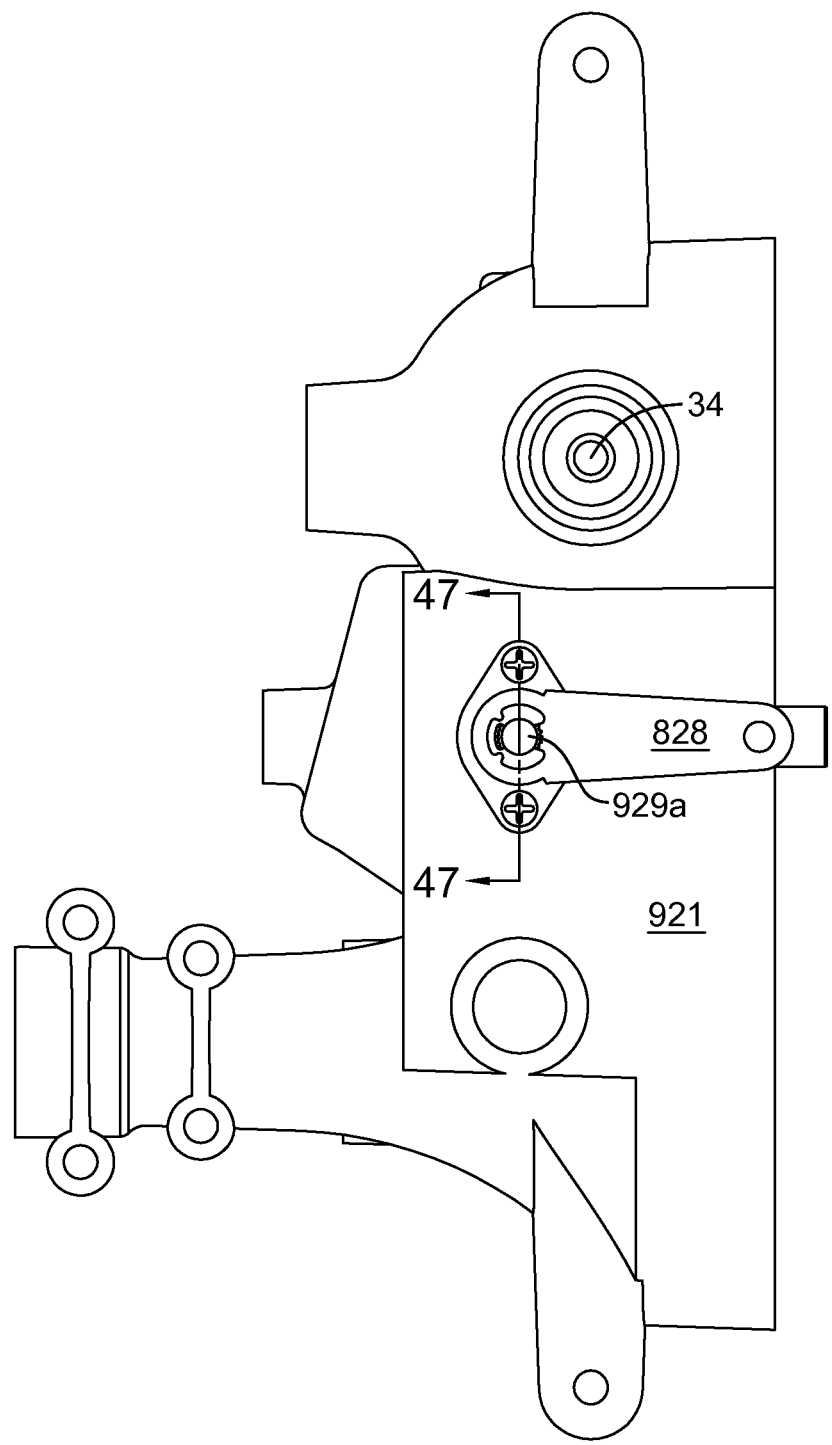
FIG. 46 is a top plan view of a portion of the external housing and certain components of a fifth embodiment of a brake mechanism for use in a hydrostatic transaxle in accordance with this invention.
Figure 48:
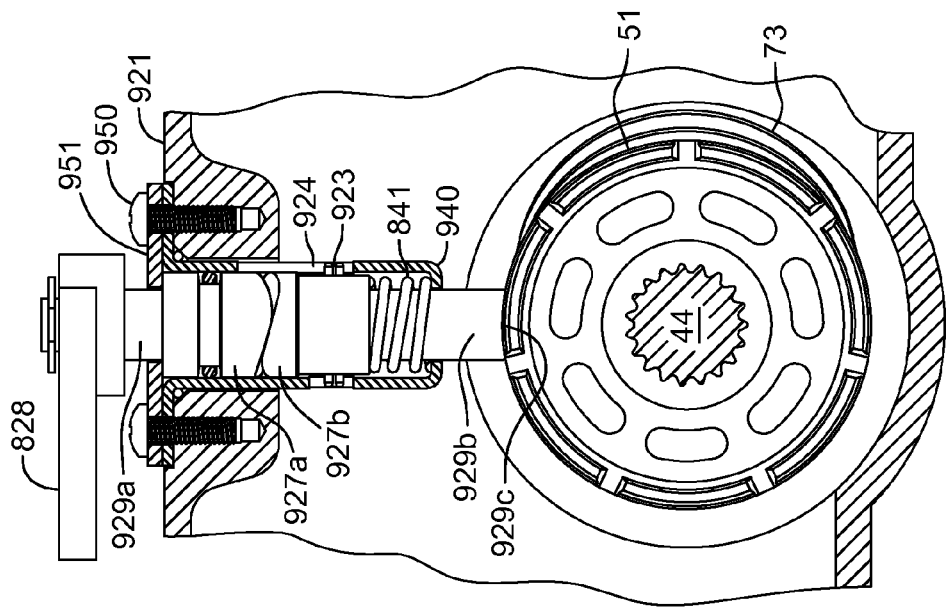
FIG. 48 is a cross-sectional side view identical to FIG. 47 but with the brake mechanism in the engaged position.
Figure 47:
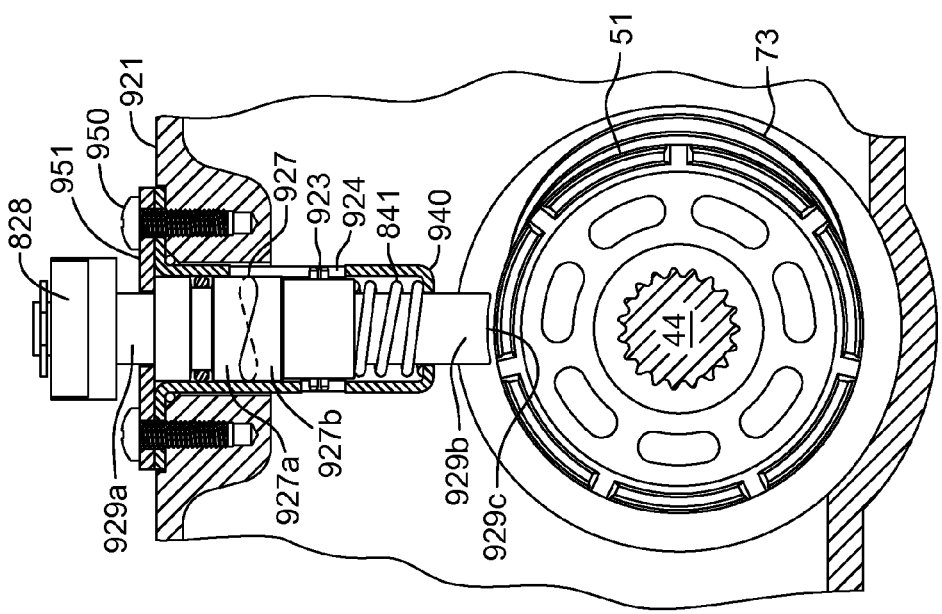
FIG. 47 is a cross-sectional side view along the lines 47-47 in FIG. 46, with the brake mechanism in the disengaged position.

A fifth embodiment of the cylinder block brake, as depicted in FIGS. 46-48, eliminates the need for housing member 821a or similar structure by using a cartridge 940 that is shaped to fit in housing 921. Upper and lower shaft members 929a and 929b, return spring 841, and cam 927 comprising cooperating cam members 927a and 927b are located in cartridge 940. Cartridge 940 is secured to housing 921 by means of screws 950 and plate 951.

Pin 923 cooperates with slots 924 formed in cartridge 940 to permit translational, but not rotational movement of lower shaft 929b. As shown in FIGS. 47 and 48, there are preferably two of these slots 924 on opposite sides of cartridge 940, and a corresponding pin 923 extends through both sides of lower shaft member 929b. It is preferred that at least one of the slots 924 be of a size sufficient to permit hydraulic fluid to flow out from and into cam 927 to prevent hydraulic blockage.

Another unique feature of this invention is an external filter 26 that may be sealed to housing member 21 and connected directly to the hydraulic porting in center section 40. This arrangement permits filter 26 to be mounted external to housing 21 below the axis of output axle 24 and provides the simplest method of connecting external filter 26 to hydraulic porting 70 in center section 40. This arrangement also allows for simple replacement of the filter. The location of filter 26 also minimizes interference with linkage and control members of transaxle 20 and it is believed to reduce the quantity of bubbles in the oil pulled into ports 85A and 85B of hydraulic circuit 70.

Figure 16:
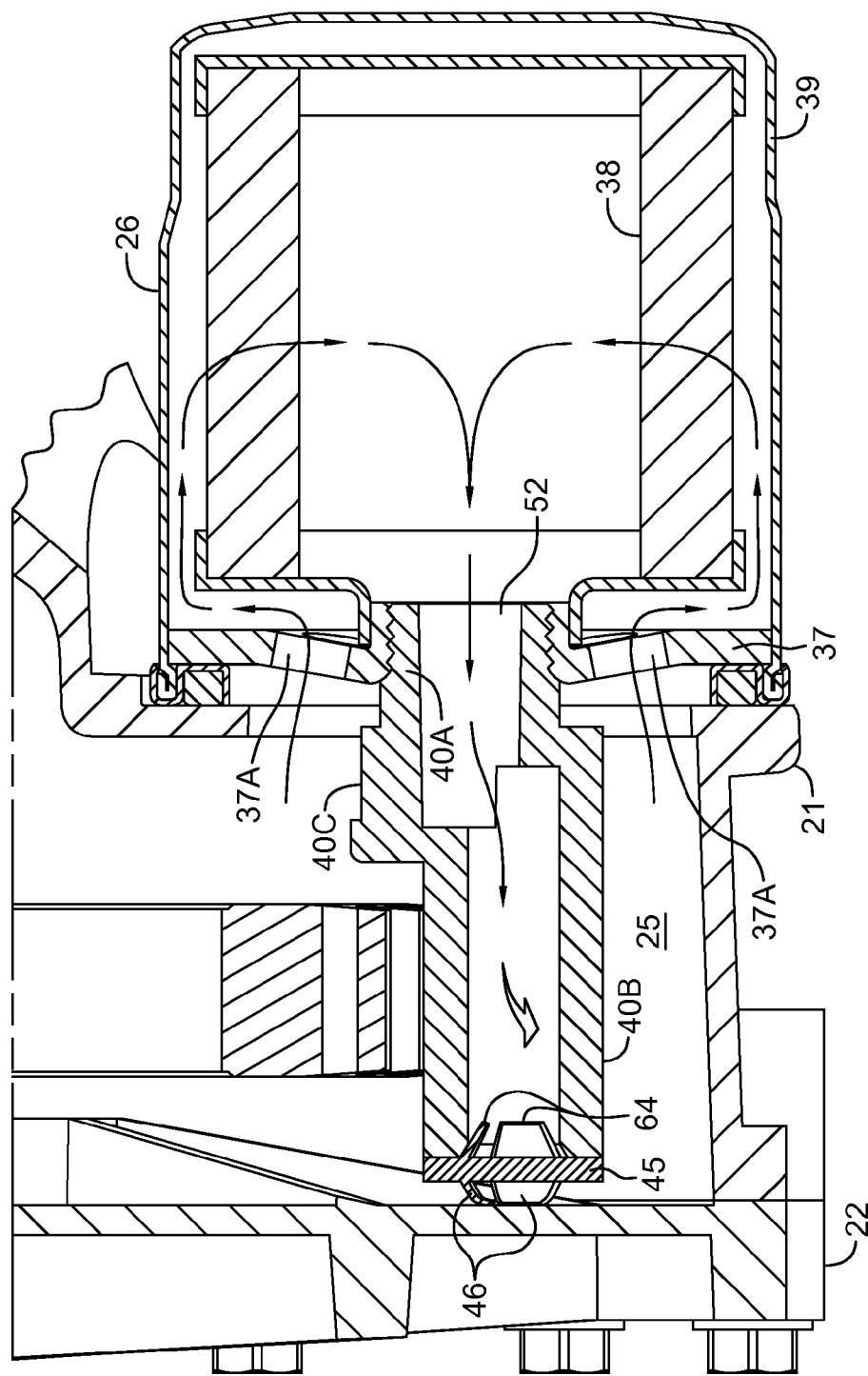
FIG. 16 is a sectional view of a portion of the transaxle along the lines 16-16 in FIG. 3.

As shown in FIGS. 2, 3, and 16, filter 26 is of a standard design comprising a filter medium 38 mounted inside a filter housing 39 with a cap 37 formed to thread filter 26 onto center section 40. Cap 37 includes openings 37A to permit oil to flow from sump 25. In this embodiment, center section 40 includes an extension 40A integrally formed therewith which extends out and to which filter cap 37 is secured. Filter 26 is connected to hydraulic porting 70 through opening 52 formed in center section extension 40A.

Extension 40A is connected to the main body of center section 40 by arm 40B and protruding portion 40C that joins arm 40B to extension 40A. Arm 40B permits flexibility in locating extension 40A and thus the location of filter 26. Also, arm 40B may be fabricated with sufficient pliability so that as filter 26 is tightened onto extension 40A any deflection that might otherwise distort the main body of center section 40 is limited to arm 40B.

Figure 25:
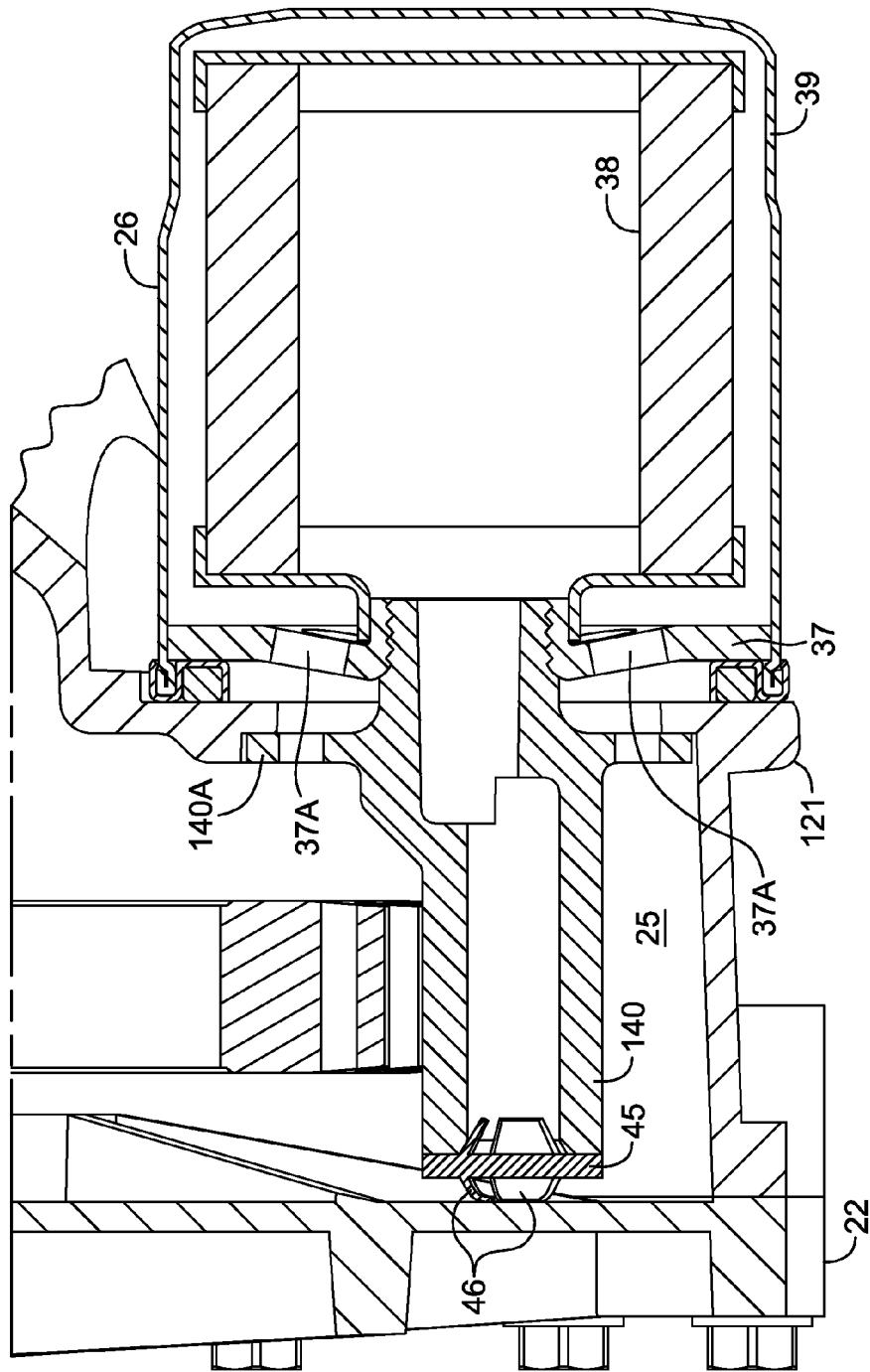
FIG. 25 is a cross-sectional view similar to that shown in FIG. 16 with an alternative embodiment of the connection of the filter to the center section.

An alternative design is shown in FIG. 25, which is generally identical to FIG. 16 with the addition of stabilizing flange 140A to center section 140. Stabilizing flange 140A assists in mounting center section 140 to housing 121 in order to limit movement of center section 140. Flange 140A could also be in the form of a plurality of fingers.

Figure 26:
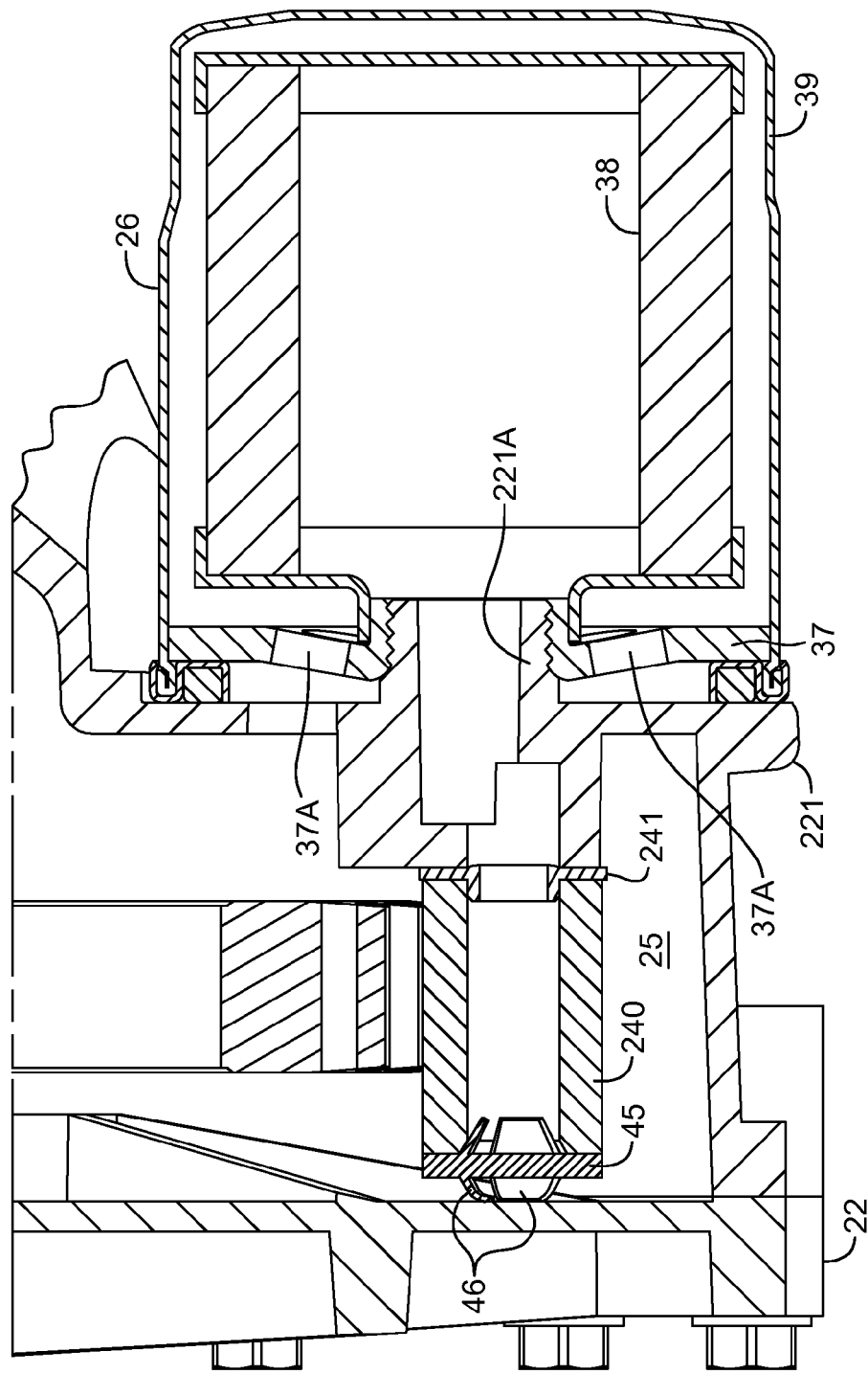
FIG. 26 is a sectional view similar to FIG. 16 and showing another alternative embodiment of the connection of the filter to the center section.

A further alternative design is shown in FIG. 26, where a boss 221A is formed as part of housing 221 for securing filter 26 to housing 221 and hydraulically connecting it to center section 240, with a gasket 241 between these elements to assist in sealing.

Figure 14:
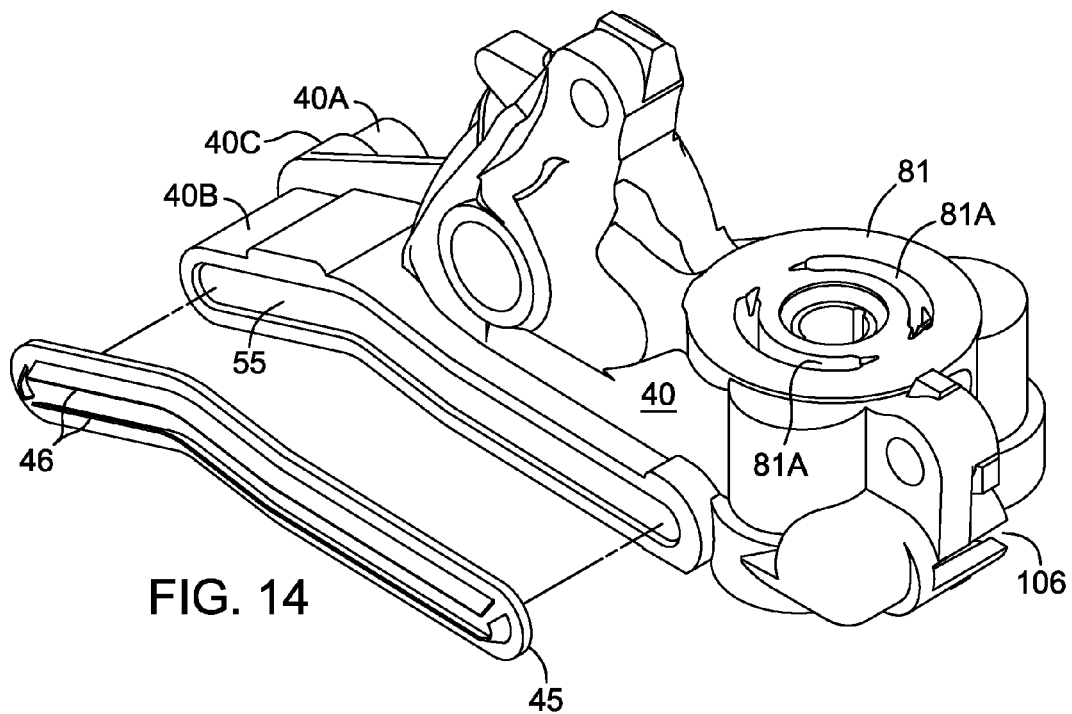
FIG. 14 is a top perspective view of the center section shown in FIG. 12.
Figure 17:
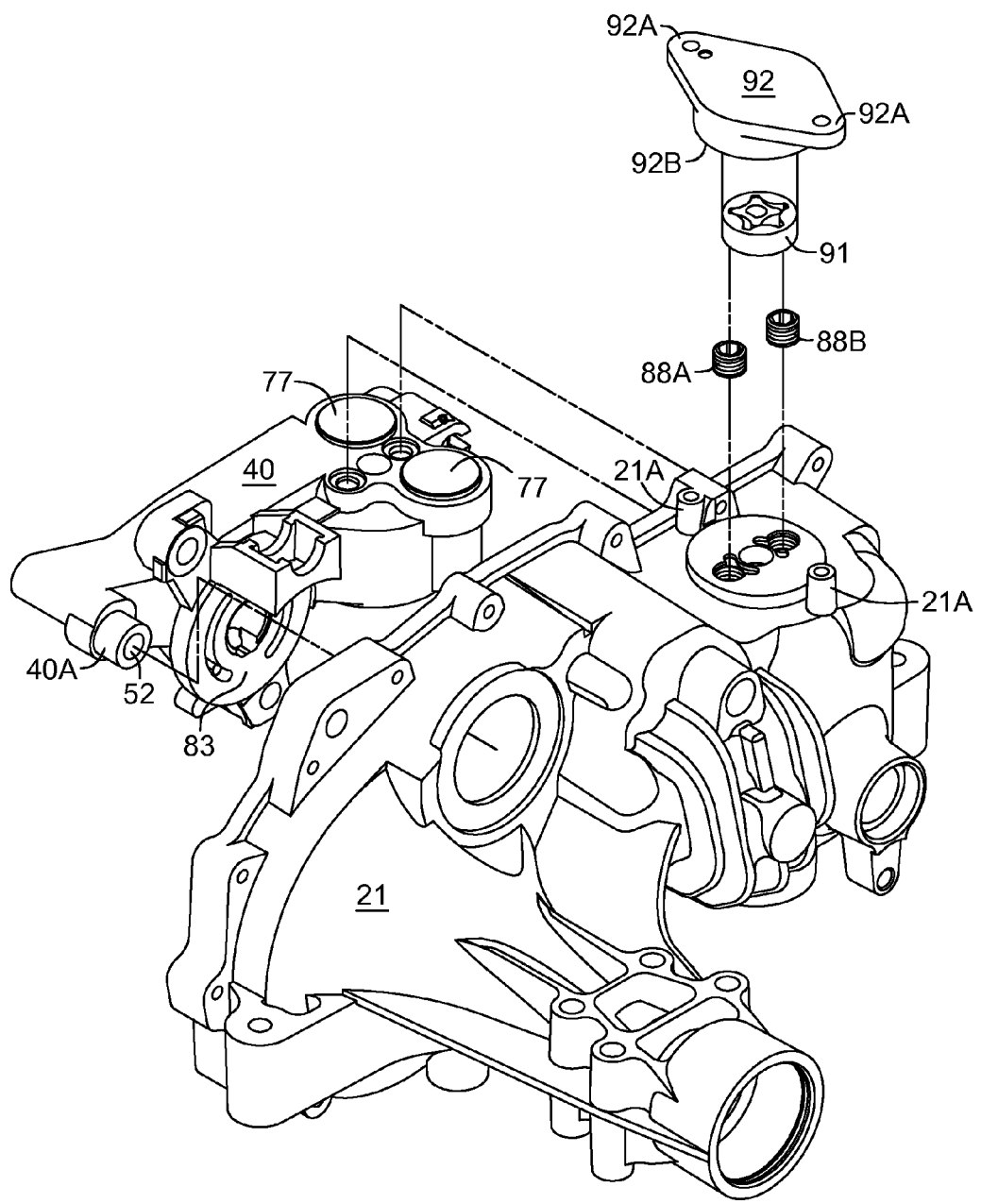
FIG. 17 is an exploded bottom perspective view of the center section, one housing component and the charge pump of the first embodiment of the subject invention.
Figure 18:
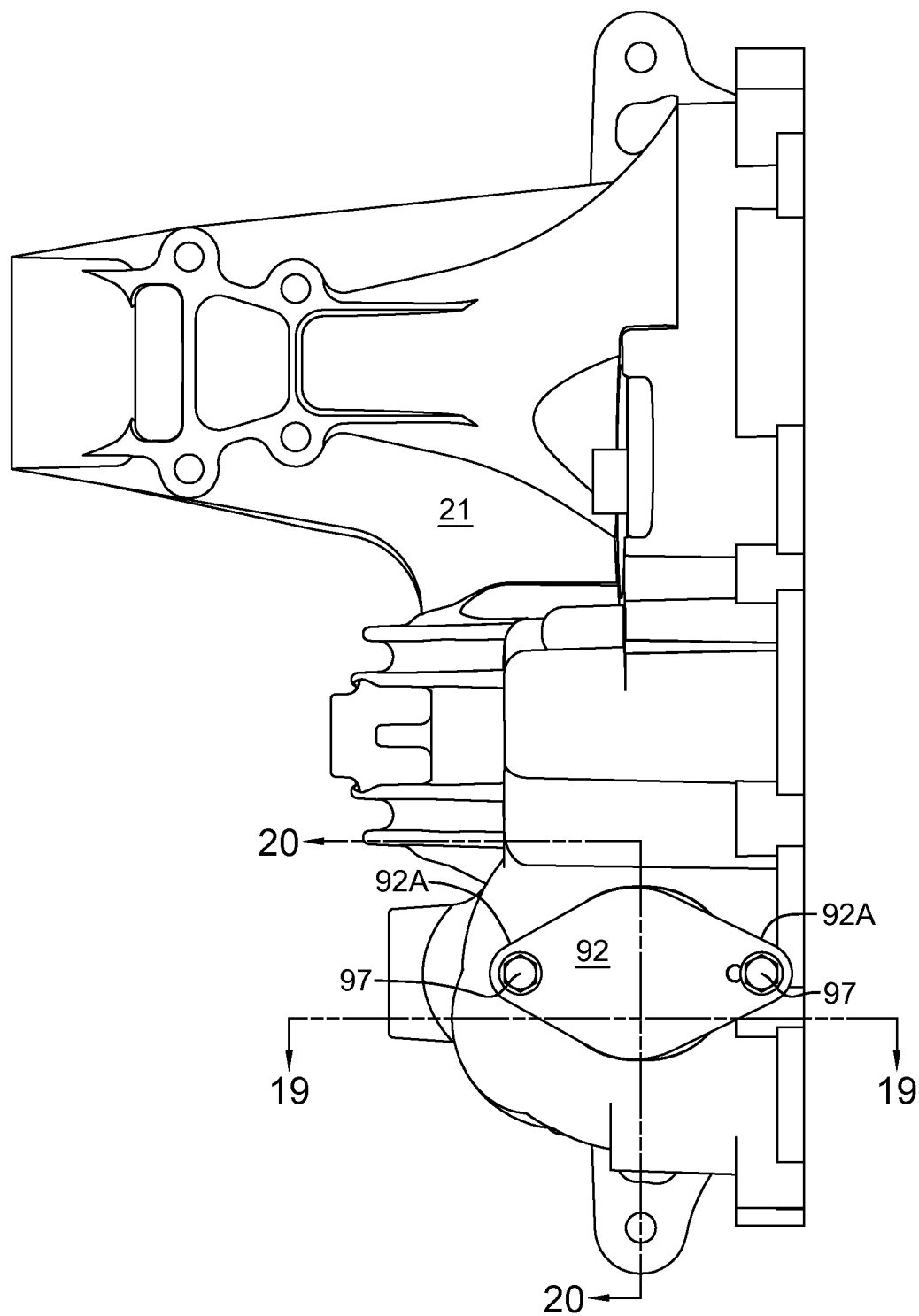
FIG. 18 is a bottom plan view of the housing component shown in FIG. 17 with the charge pump mounted thereon.

Center section 40 and its components can be seen most clearly in FIGS. 12, 14 and 17. The hydraulic porting 70 is shown in FIGS. 13 and 15, both of which are perspective "negative" stylized views showing the shapes of the various ports and openings that comprise hydraulic porting 70. In essence, these two views show the actual hydraulic porting 70 itself.

Pump running surface 81 has two kidneys 81A formed thereon that connect hydraulic porting 70 to pump cylinder block 41. Motor running surface 83 has two kidneys 83A that similarly connect motor cylinder block 51 to porting 70, and kidneys 83A and 81A are connected through ports 85A and 85B.

A charge pump cover 92 is mounted by fasteners 97 external to housing 21 and encloses gerotor style charge pump 91, which is connected to porting 70 through openings formed in the housing into which are mounted externally threaded plugs 88. The use of a high durometer plastic material for plugs 88 is desirable to provide as much sealing as possible between plugs 88 and center section 40 as plastic will yield against the much stiffer metal typically used in center sections. Plugs 88 are also preferably provided with an internal hex for ease in tightening them to center section 40. Charge cover 92 also features extensions 92A that interface with screw bosses 21A in a plane offset from the bottom 92B of cover 92. The positions of extensions 92A permit flexibility in attachment of cover 92 by providing clearance with other features on housing 21.

Figure 11:
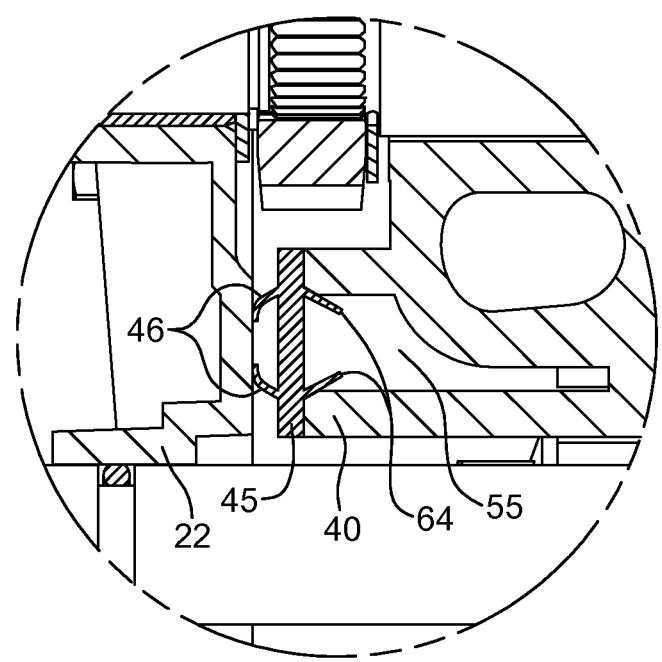
FIG. 11 is a sectional view of a portion of the transaxle shown in FIG. 10 along the same section line, showing in particular the flexible cover between the center section and the side housing.

Filter opening 52 is connected to charge pump 91 through channel 55, as shown in FIGS. 13, 14 and 15. A cover member 45 is mounted to center section 40 in order to close channel 55; this design simplifies the manufacture of center section 40. Having channel 55 formed in such a manner makes center section 40 significantly easier to cast as compared to a closed channel. In addition, having channel 55 open during assembly aids in clearing out any detritus that may be present in channel 55 after casting or machining. A pair of flexible fingers 46 is formed on the external side of cover 45 and engages against housing cover member 22 when the unit is assembled as shown in FIGS. 11 and 16; this arrangement assists in locating and securing cover 45 without the need for additional fasteners or adhesives. As shown in FIG. 16, another set of flexible members 64, which in this embodiment are preferably identical to flexible fingers 46, are formed on the inside of cover 45 to assist in locating cover 45 on center section 40 in order to increase ease of assembly. Additionally, since cover 45 may be used in a pair of mirror image transaxles, in the mirror image of the configuration shown in FIG. 16 flexible members 64 would interface with the side housing and flexible fingers 46 would interface with the center section, increasing the utility of cover 45 and reducing costs.

Figure 23:
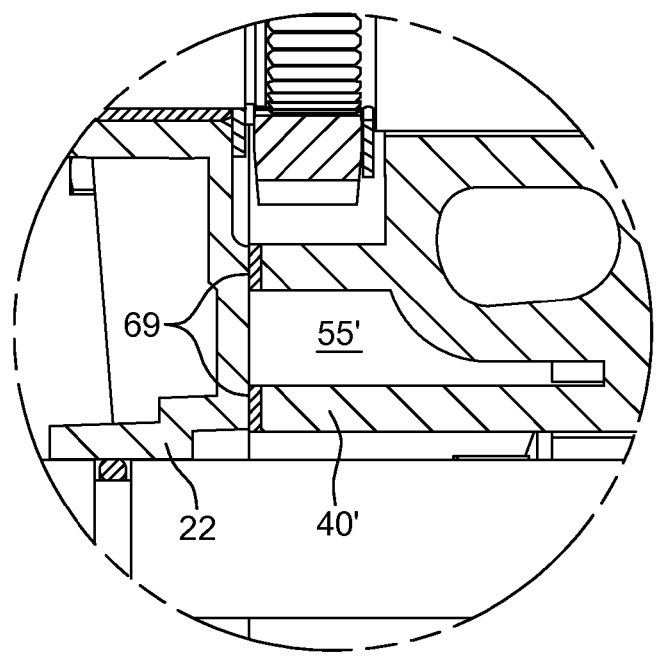
FIG. 23 is a cross-sectional view similar to FIG. 11 showing a different embodiment of the connection between the side housing and the center section.

An alternative embodiment is shown in FIG. 23, where gasket 69 is located between housing 22 and center section 40' adjacent channel 55' in place of flexible cover 45. Gasket 69 could be either a formed gasket or sealing material.

Figure 24:
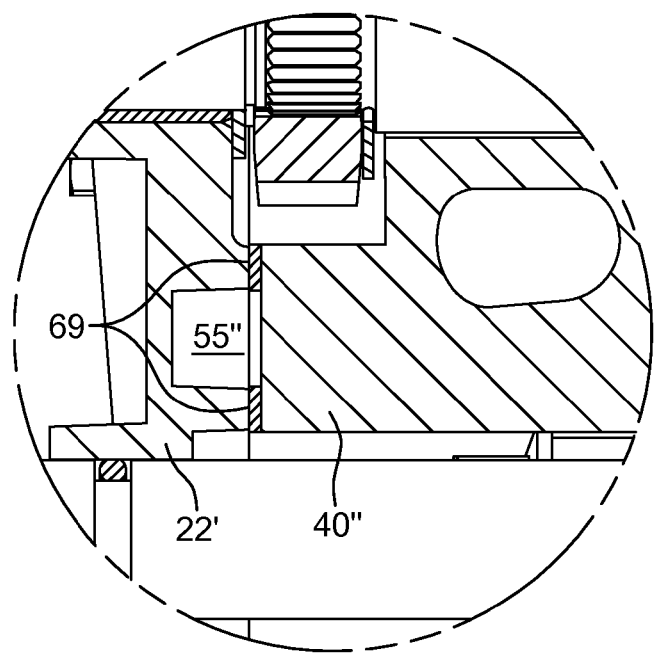
FIG. 24 is a sectional view similar to FIG. 11 showing yet another embodiment of the connection between the center section and the side housing.

As another alternative, as shown in FIG. 24, channel 55" can be formed in housing member 22' instead of in center section 40". Again a gasket 69 may be used to seal channel 55"

Referring to FIGS. 13, 18, 19 and 20, openings 78 and gallery connection 79, which may be considered a first passage, act to form fluid gallery 80. A pair of caps 77 is mounted on center section 40 opposite to pump running surface 81 to close openings 78. Caps 77 may be mounted in openings 78 and secured there by interaction with center section 40 against housing member 21, in order to improve ease of assembly. For example, charge pressure from charge pump 91 will push caps 77 against housing 21, eliminating the need for fasteners, threads and the like, and also reducing tolerance concerns during assembly.

Figure 19:
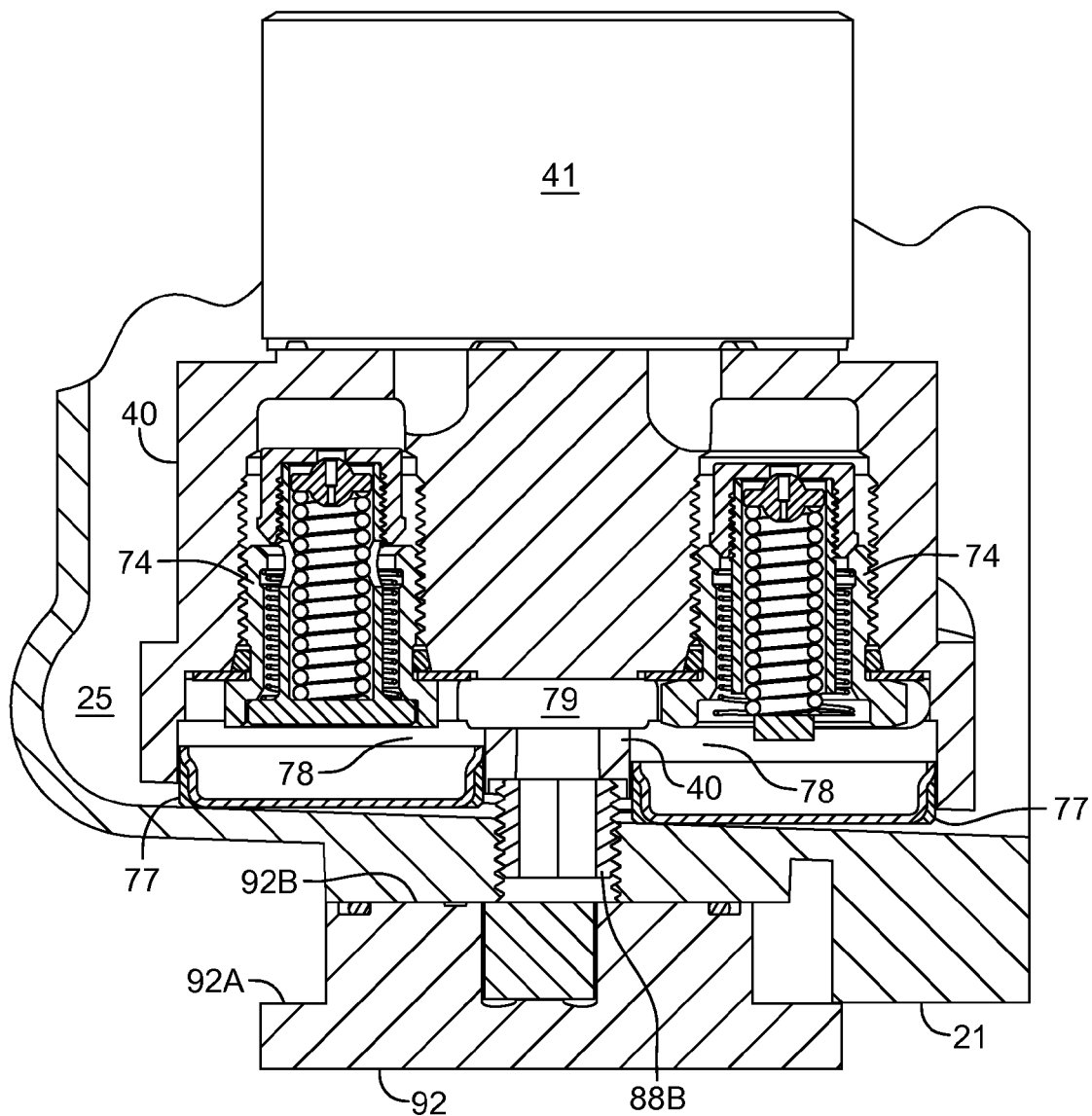
FIG. 19 is a cross-sectional view along the lines 19-19 in FIG. 18, with the pump cylinder block shown complete for clarity.

As is known in the art, ports 85A and 85B comprise different sides of the hydraulic circuit 70, so that when one is under pressure from the pump, the other will be under low pressure, often referred to as vacuum. Ports 85A and 85B are connected to gallery 80 through check valves 74. Specifically, a pair of check valves 74 is mounted in openings 78 and operates to direct oil from gallery 80 to respective ports 85A and 85B. Check valves 74 are shown most clearly in FIG. 19. The check valve 74 on the left in FIG. 19 is shown in the open position, while the one on the right is in the closed position. These valves are known in the art and are described in commonly owned U.S. Pat. No. 7,028,708, the terms of which are incorporated herein by reference. Other known check valve designs could also be used in this invention.

Figure 20:
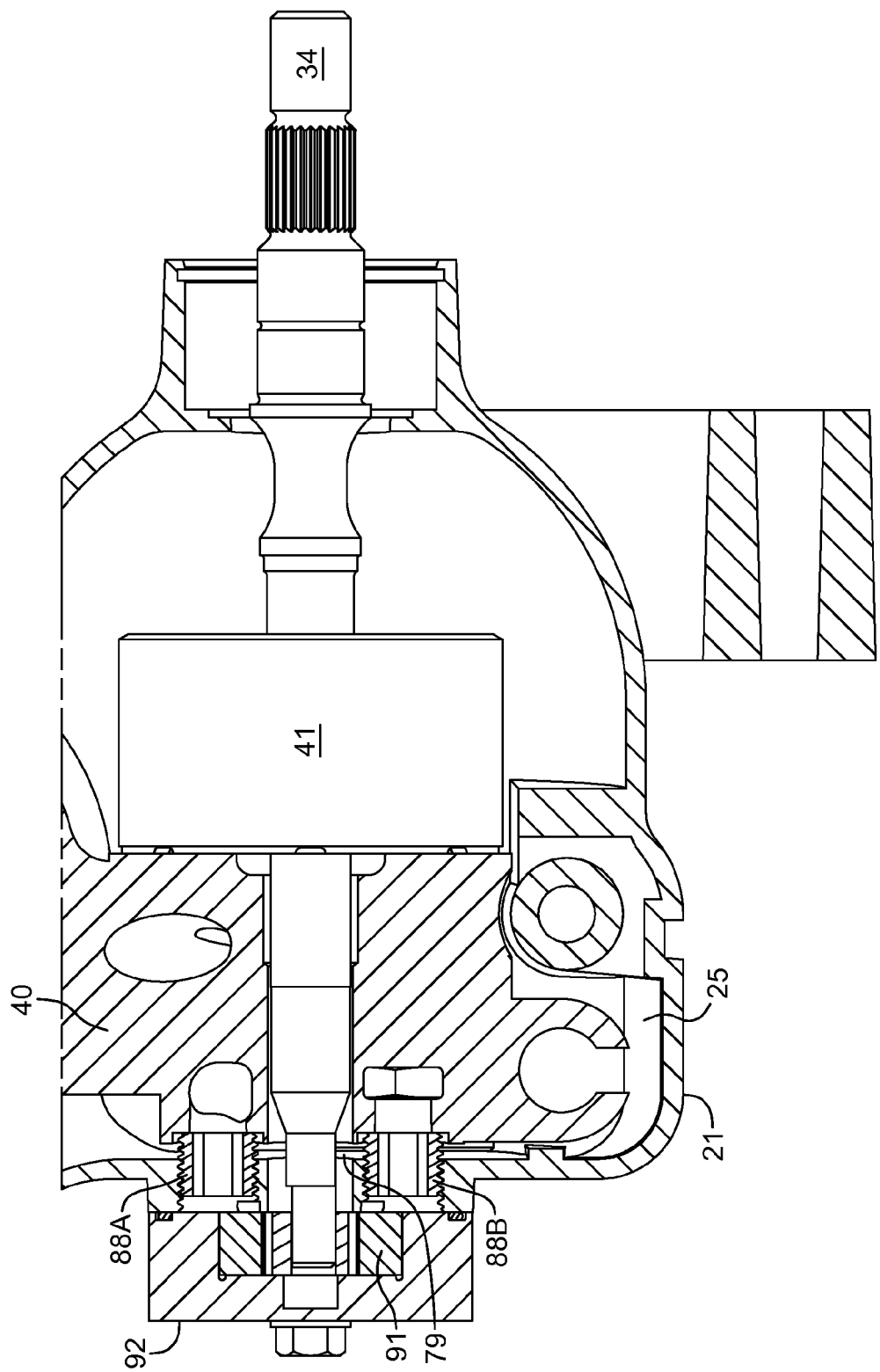
FIG. 20 is the orthogonal view of FIG. 19 along the lines 20-20 in FIG. 18 with some elements shown complete for clarity.
Figure 21:
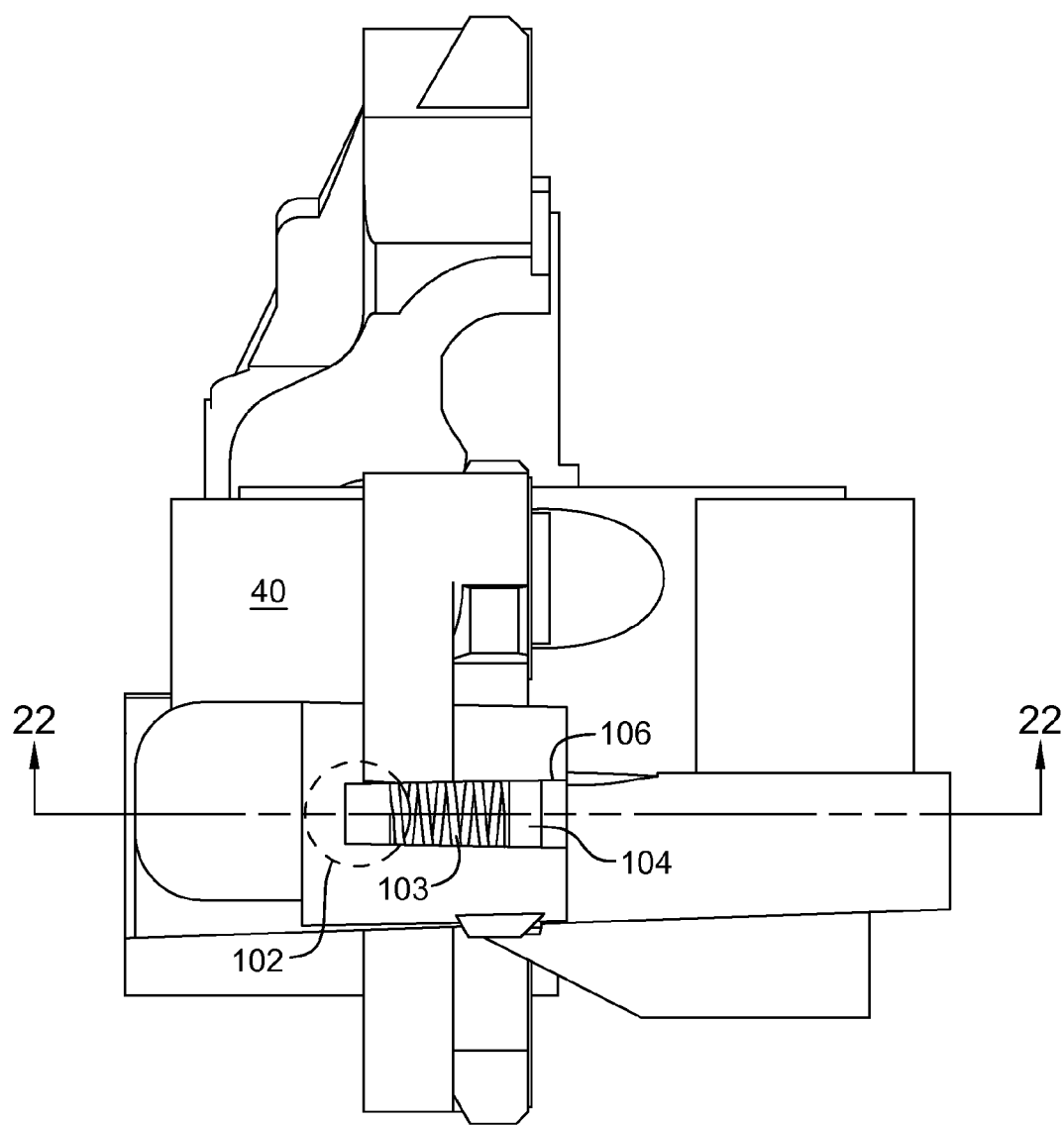
FIG. 21 is a front end view of the center section shown in FIG. 12.
Figure 22:
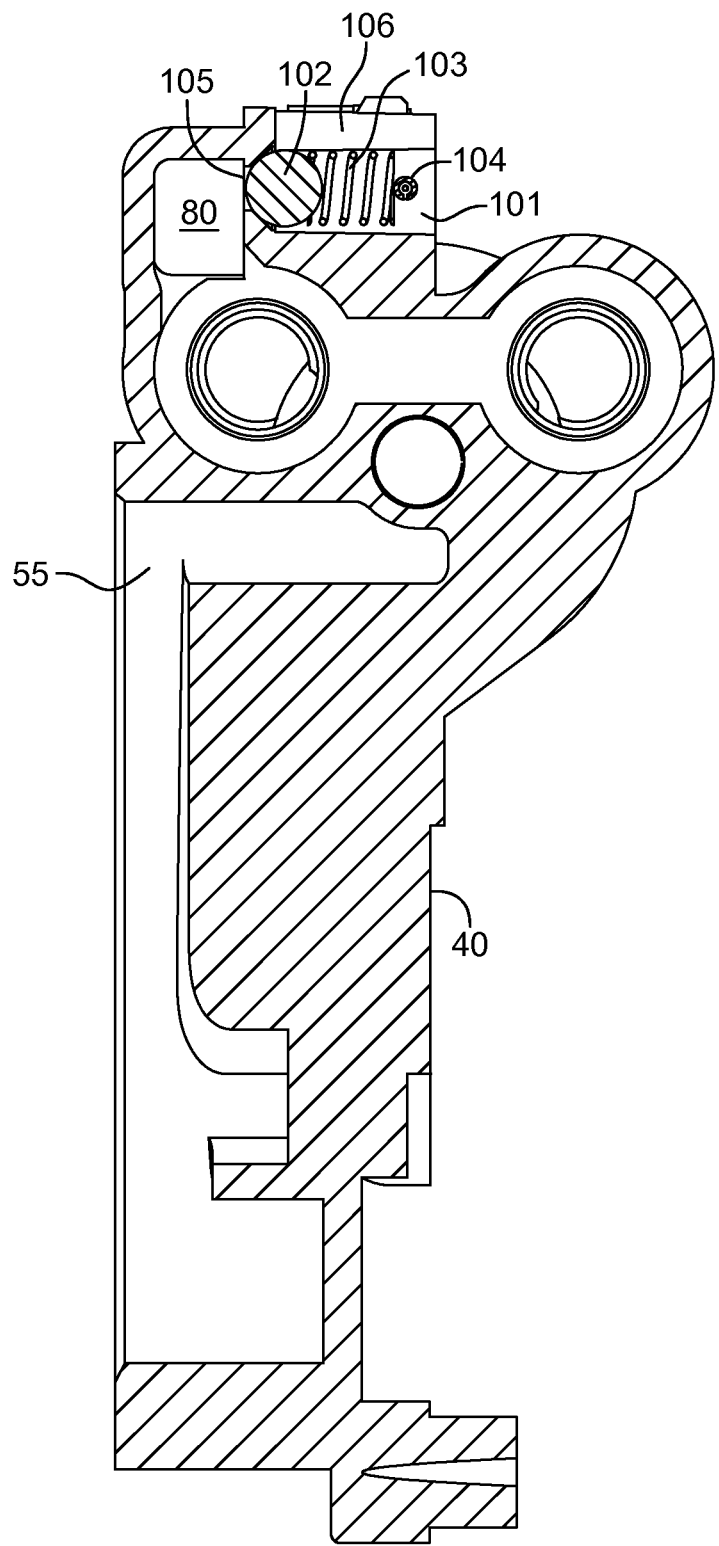
FIG. 22 is a cross-sectional view of the center section along the lines 22-22 in FIG. 21.

As seen in, e.g., FIGS. 17, 19 and 20, charge pump plug 88B forms a second passage in housing 21 and charge pump plug 88A forms a third passage in housing 21. Oil is pulled from sump 25 through filter 26 into hydraulic porting 70 and specifically through channel 55 to first charge pump plug 88A. The action of gerotor charge pump 91 pulls oil through first plug 88A and discharges it under higher pressure through second plug 88B to gallery 80. Depending on which side of hydraulic circuit 70 is under pressure, oil will be pushed from gallery 80 through one of the check plugs 74 to one of the ports 85A or 85B.

An alternative to threaded plugs 88A and 88B is shown in FIGS. 49 and 50, where tubes 1088A and 1088B are pressed into center section 1040 to form the third passage and the second passage, respectively. Each tube 1088 is preferably made of a metal such as steel and has a pair of flexible rings 1089 glued or otherwise secured at opposite ends thereof. Each ring 1089 has a hemispherical cross-section; this feature could also be integrally formed with tubes 1088. The cross-section of each ring 1089 may be other configurations, such as a trapezoid or free-form if form-in-place gasket material is used.

As shown in FIG. 49, a projection 1090 on charge pump cover 1092 acts to retain tubes 1088A and 1088B in place after they are pressed into the bottom of center section 1040 to connect to the respective sides of the hydraulic circuit to charge pump 1091. Flexible rings 1089 act to secure tubes 1088A and 1088B inside center section 1040 and inside housing member 1021. A bypass mechanism is also shown in FIG. 10. Similar bypass mechanisms are shown in commonly owned U.S. Pat. Nos. 5,314,387; 6,374,604 and 6,370,876, the terms of which are incorporated herein by reference. As with other designs, a rotatable actuator 93 is rotated by means of a handle 94. Cam 96 on the bottom end of actuator 93 acts to move puck 95 to the right in FIG. 10, lifting motor cylinder block 51 off motor running surface 83, breaking the hydraulic seal and permitting oil to exit hydraulic circuit 70 to sump 25, thereby placing the unit into bypass. In prior designs, puck 95 would be mounted on an exterior surface of a bearing. In the present design, puck 95 rides directly on motor shaft 44, simplifying assembly and thus reducing costs. This design also permits motor shaft 44 to be supported only on the ends, as noted above, since there is no bearing in center section 40.

This design also provides a charge relief mechanism to permit oil to be dumped to sump 25 when the pressure in charge gallery 80 exceeds predetermined limits. This design can be seen in FIGS. 14, 15, 21 and 22. A charge relief passage 101 is formed in center section 40 perpendicular to check plugs 74, and is connected to a portion of charge gallery 80 through opening 105. A side channel 106 is formed in passage 101 to permit oil to exit therethrough to sump 25. Ball 102 is mounted in passage 101 and held against opening 105 by means of spring 103. Pin 104 is pressed into center section 40 to retain spring 103 in place. As pressure builds in gallery 80 and exceeds the force of spring 103, ball 102 will unseat from opening 105 to permit oil to exit through side channel 106 to sump 25. The use of side channel 106 eliminates the need for oil to travel around ball 102 to exit to sump 25, which minimizes tolerance concerns when assembling the unit.

Figure 27:
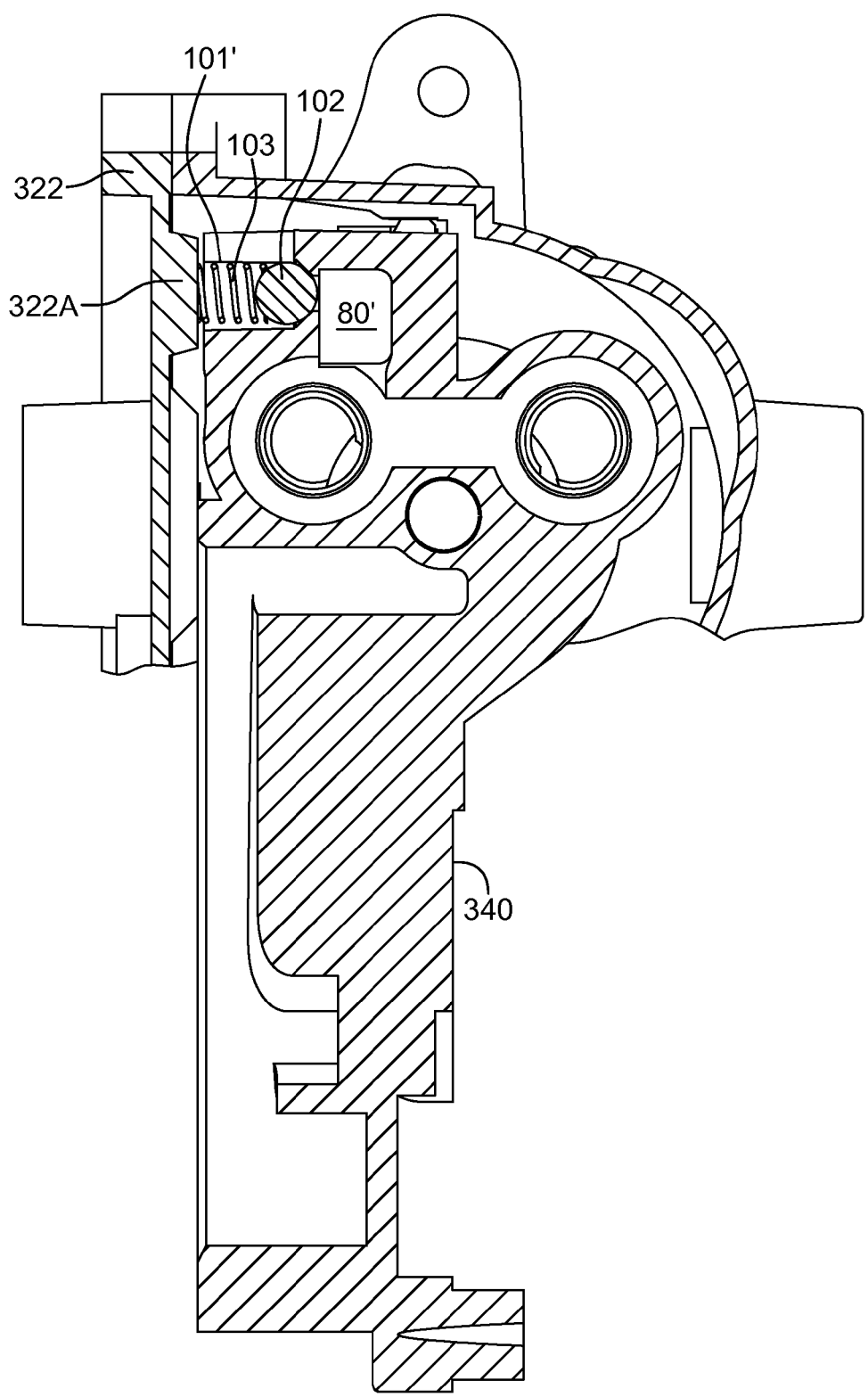
FIG. 27 is a cross-sectional view of a center section similar to FIG. 22 showing a portion of the transaxle housing in accordance with another embodiment of this invention, and specifically incorporating an alternative configuration of the charge relief.

An alternative design for the charge relief is shown in FIG. 27, which eliminates the need for pin 104 by providing a boss 322A (or similar structure) on side housing 322, which then contacts spring 103 to retain it in place.

Another embodiment of this transaxle design may incorporate a manifold located between the center section and charge pump; the use of such a manifold is an optional alternative to gallery 80. Two different embodiments of such a manifold are shown in FIGS. 28 and 30 and FIGS. 29 and 31.

Figure 28:
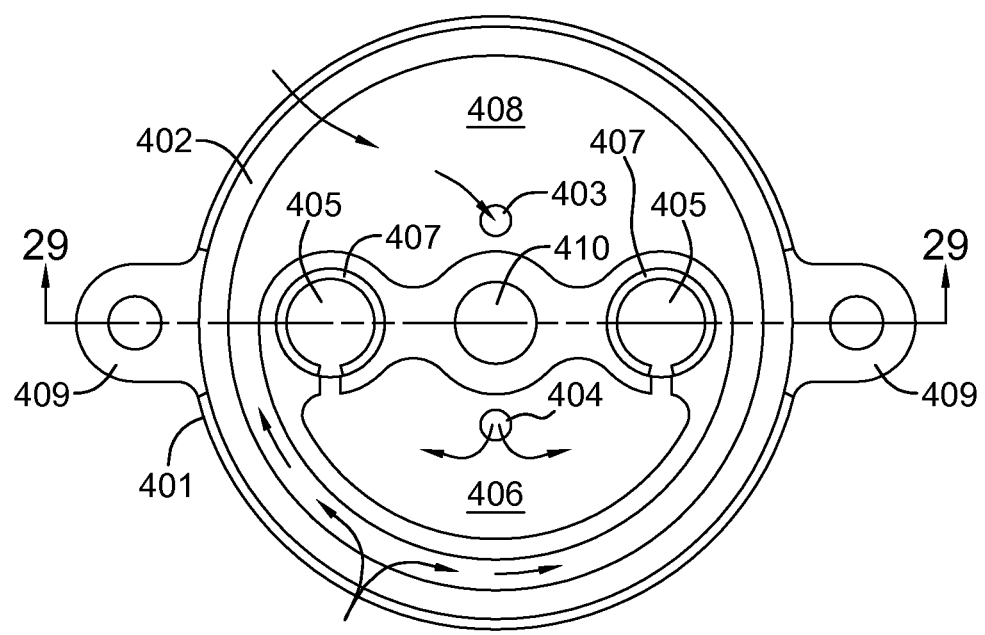
FIG. 28 is a top plan view of a manifold that may be used in accordance with another embodiment of this invention.
Figure 29:
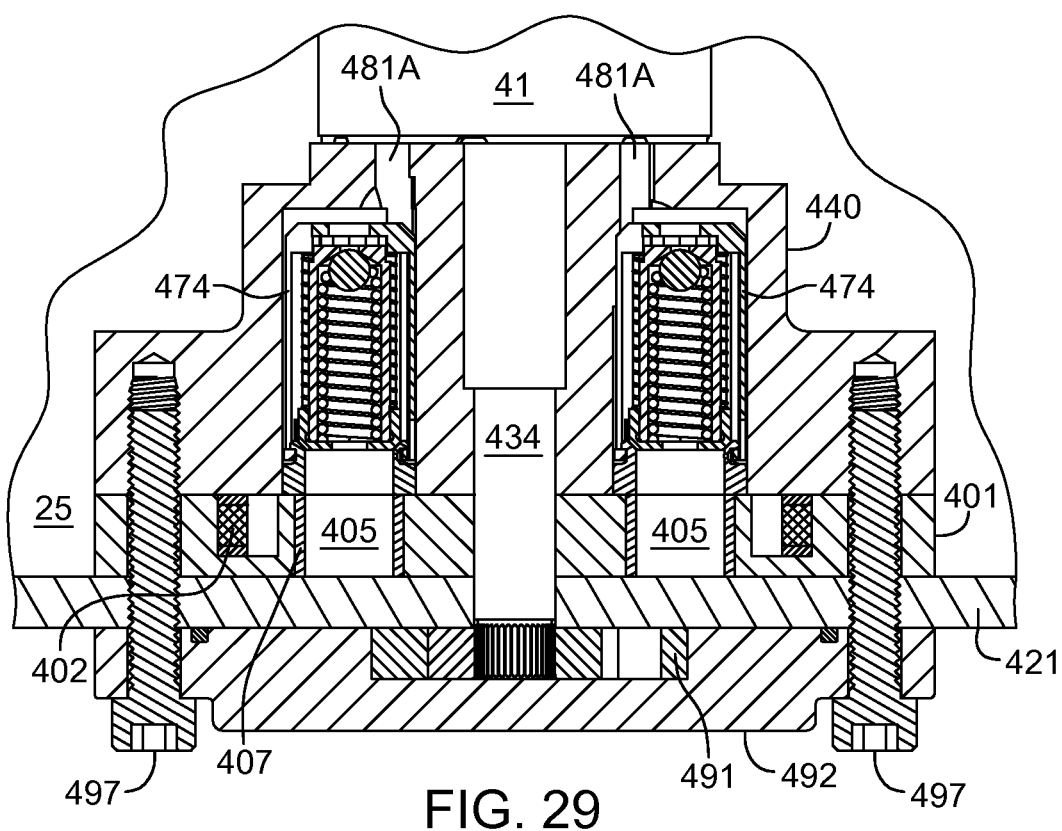
FIG. 29 is a cross-sectional side view of a portion of a transaxle incorporating the manifold in FIG. 28 with the manifold sectioned along the lines 29-29 to match the transaxle cross-sectioning.

Turning first to manifold 401 depicted in FIGS. 28 and 29, one can see that this may be used with a transmission similar to that described above, and as before like numerals will be used to describe identical or substantially identical parts. A pump cylinder block 41 is shown rotatably mounted on center section 440 and connected to the hydraulic porting therein via pump kidneys 481A. A pair of check valves 474 is also pressed into center section 440. A gerotor charge pump 491 is mounted in charge pump casing 492 which is secured to housing 421 by a plurality of fasteners 497. Input shaft 434 extends through opening 410 to power charge pump 491. Fasteners 497 also extend through ears 409 on manifold 401.

During operation, oil will flow from sump 25 through filter 402 into a first gallery 408 formed inside manifold 401. As will be understood, filter 402 is open to main sump 25 around the entire circumference of manifold 401 except in the areas immediately adjacent ears 409. Filtered oil that is collected in first gallery 408 is then pulled into charge pump 491 through charge inlet 403, and charged oil is discharged through charge outlet 404 into second gallery 406 also formed in manifold 401, where it is then accessible to one of the check valve openings 405, and then to one of the check valves 474.

Manifold 401 assists in the retention of check valves 474 inside center section 440. Manifold 401 is preferably composed of a plastic material or a metal such as aluminum. An insert 407 may be optionally placed inside openings 405 to assist in supporting check valves 474, if additional support is needed. Insert 407 may be plastic or metal of sufficient strength to support check valves 474 to the maximum anticipated pressure in ports 85A and 85B.

Figure 30:
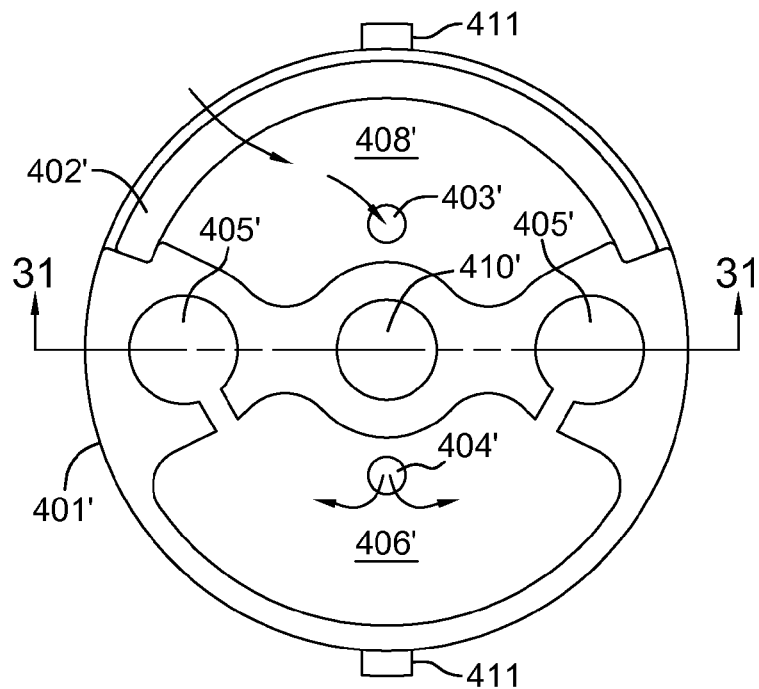
FIG. 30 is a top plan view of a manifold that may be used in accordance with another embodiment of this invention.
Figure 31:
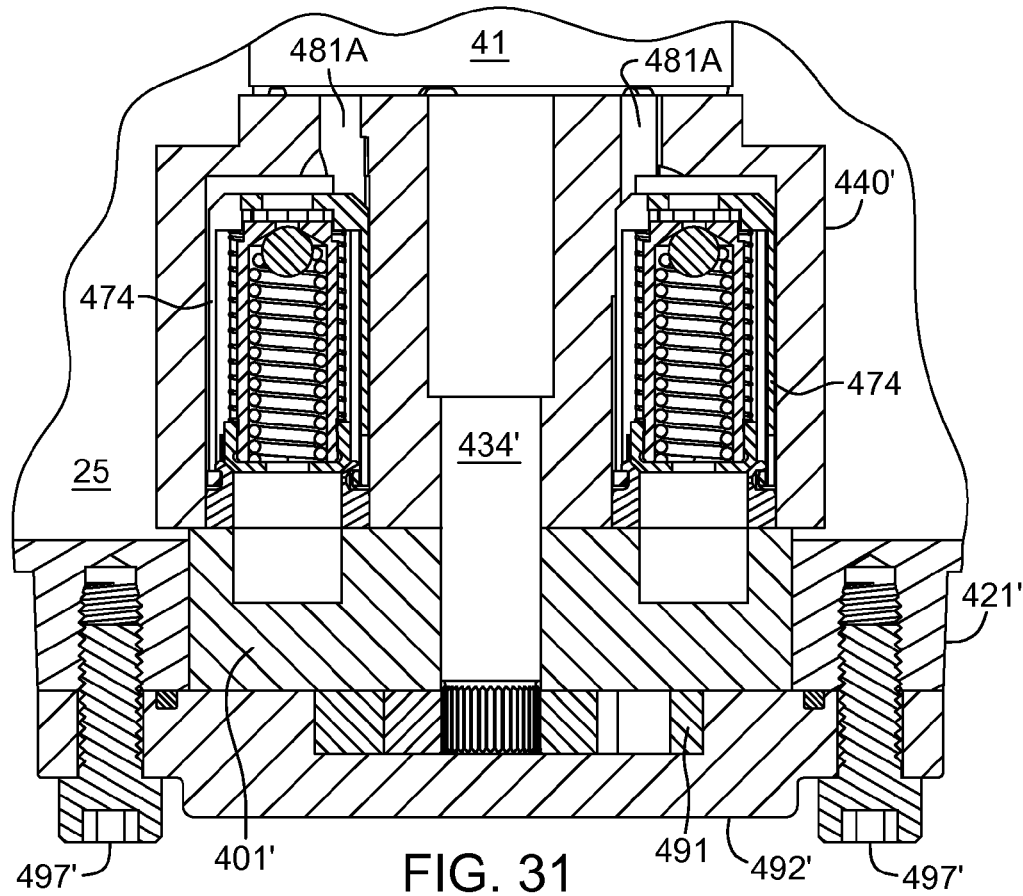
FIG. 31 is a cross-sectional side view of a portion of a transaxle incorporating the manifold in FIG. 30 with the manifold sectioned along the lines 31-31 to match the transaxle cross-sectioning.

As shown in FIGS. 30 and 31, check valves 474 can also be directly supported by the manifold. Specifically, FIGS. 30 and 31 depict an alternative embodiment where manifold 401' is captured by housing 421' and sandwiched between charge cover 492' and center section 440' and is not secured by fasteners. Filter 402' operates in a manner similar to that described with respect to FIGS. 28 and 29, so that filtered oil is brought from sump 25 to first gallery 408', through charge inlet 403' to charge pump 491, then through charge outlet 404' to second gallery 406' where it is made available to either check valve 474 through check openings 405'. Anti-rotation tabs 411 interface with a mating feature in housing 421' and aid in maintaining the orientation of manifold 401' with respect to check valves 474 and passageways to and from charge pump 491.

A benefit to the use of either manifold 401 or 401' is an increase in allowed tolerances during assembly of the unit. For example, as the unit is put under hydraulic pressure, check plugs 474 are pushed downwardly onto manifold 401 (or 401'). Check plugs 474 also assist in locating manifold 401 (or 401') against housing component 421, as shown in FIG. 29 or charge cover 492', as shown in FIG. 31.

Figure 51:
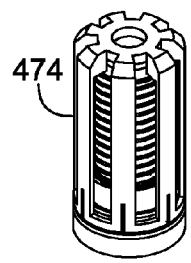
FIG. 51 is a perspective view of the combination check and relief valve shown in FIGS. 31 and 32.
Figure 52:
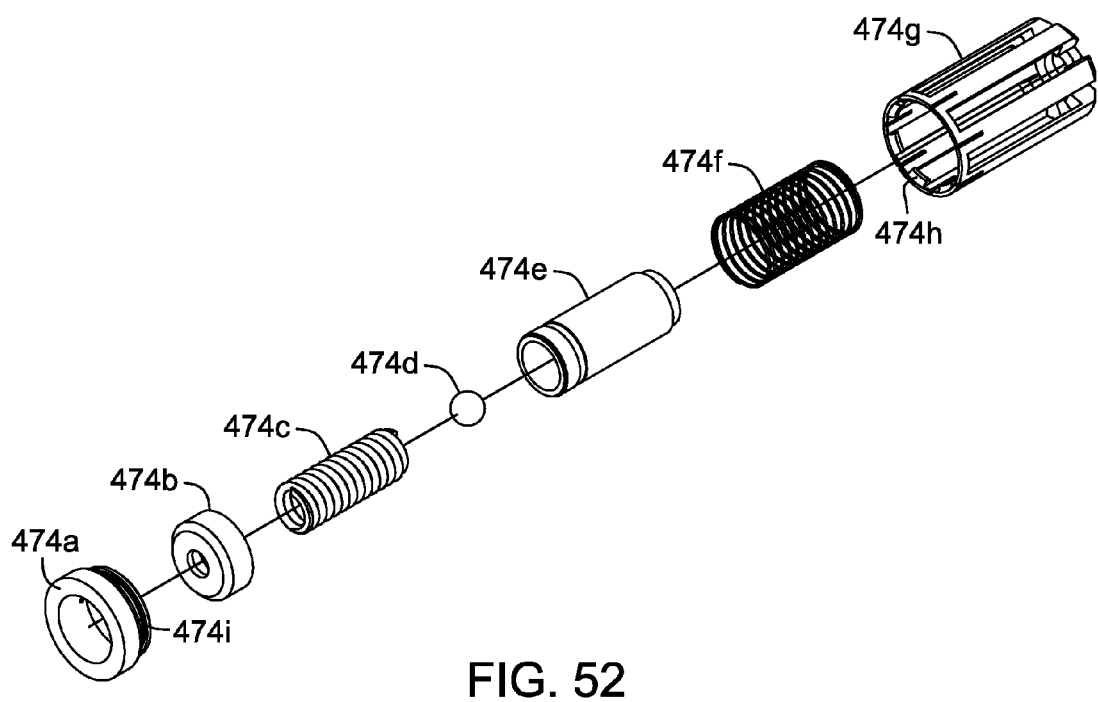
FIG. 52 is an exploded view of the valve assembly shown in FIG. 51.

The specific details of check valve 474 are shown in FIGS. 51 and 52. Check valves 474 are structured to perform as a combination check and pressure relief valve. Fingers 474h on cage 474g are engaged to groove 474i on check valve seat 474a to secure the assembly together. Check spring 474f holds check poppet 474b against seat 474a. Check poppet 474b lifts off of check valve seat 474a when the hydraulic circuit is at a low pressure, permitting fluid to enter the hydraulic circuit through the seat 474a. Fluid then flows into cage 474g and out the slots formed therein and into its respective kidney 481A.

The pressure relief function is provided by relief body 474e, in which is mounted relief ball 474d on relief spring 474c. When pressure in the hydraulic circuit, and specifically in kidney 481A, exceeds a predetermined amount, spring 474c will compress, lifting ball 474d off its seat in relief body 474e, permitting fluid to flow past ball 474d, through or around spring 474c and through check poppet 474b and the corresponding opening in the center of seat 474a.

Valve body 474e is connected to poppet 474b by means of a press fit, threads, crimping, brazing or other techniques known in the art.

Figure 32:
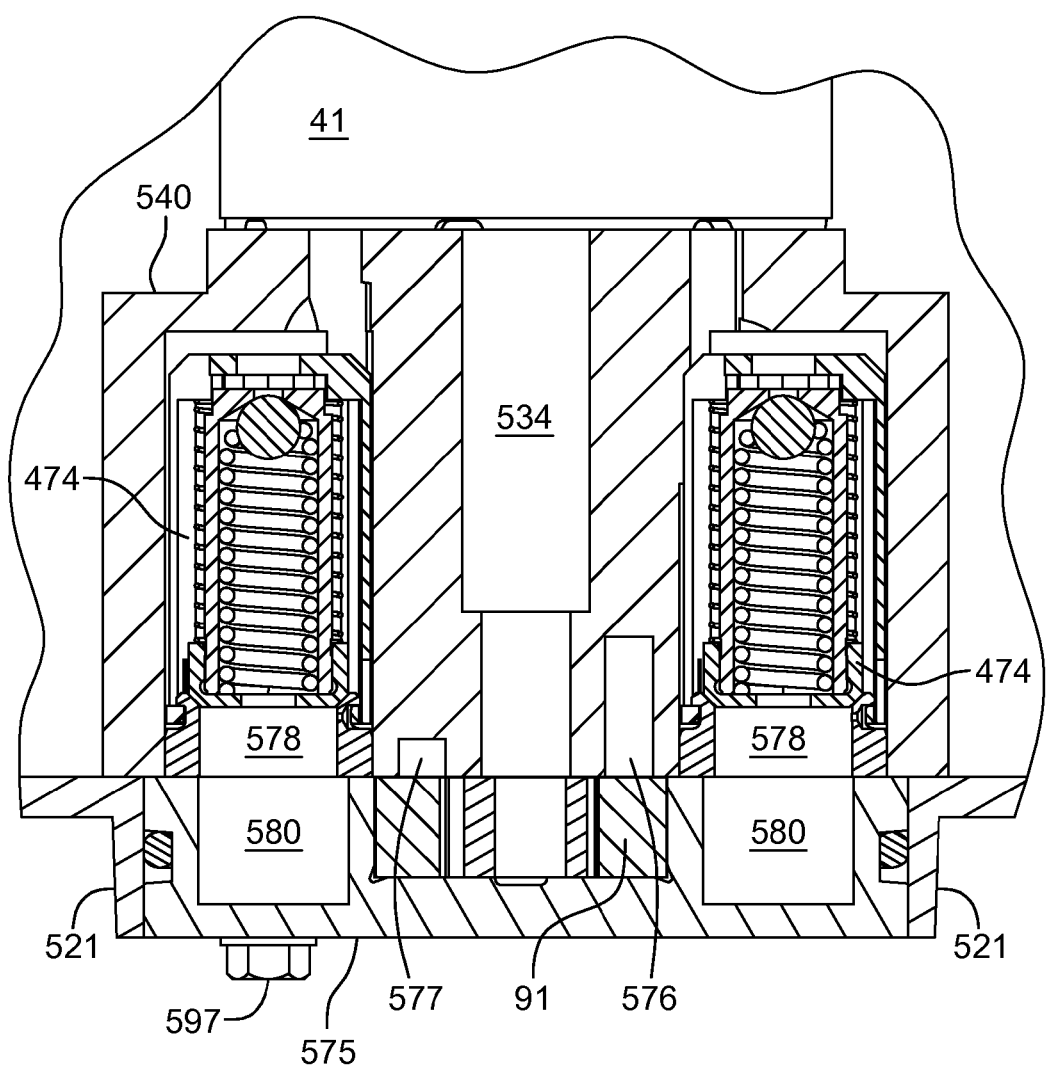
FIG. 32 is a cross-sectional side view of a portion of a transaxle similar to FIG. 31 in accordance with yet another embodiment of this invention.
Figure 33:
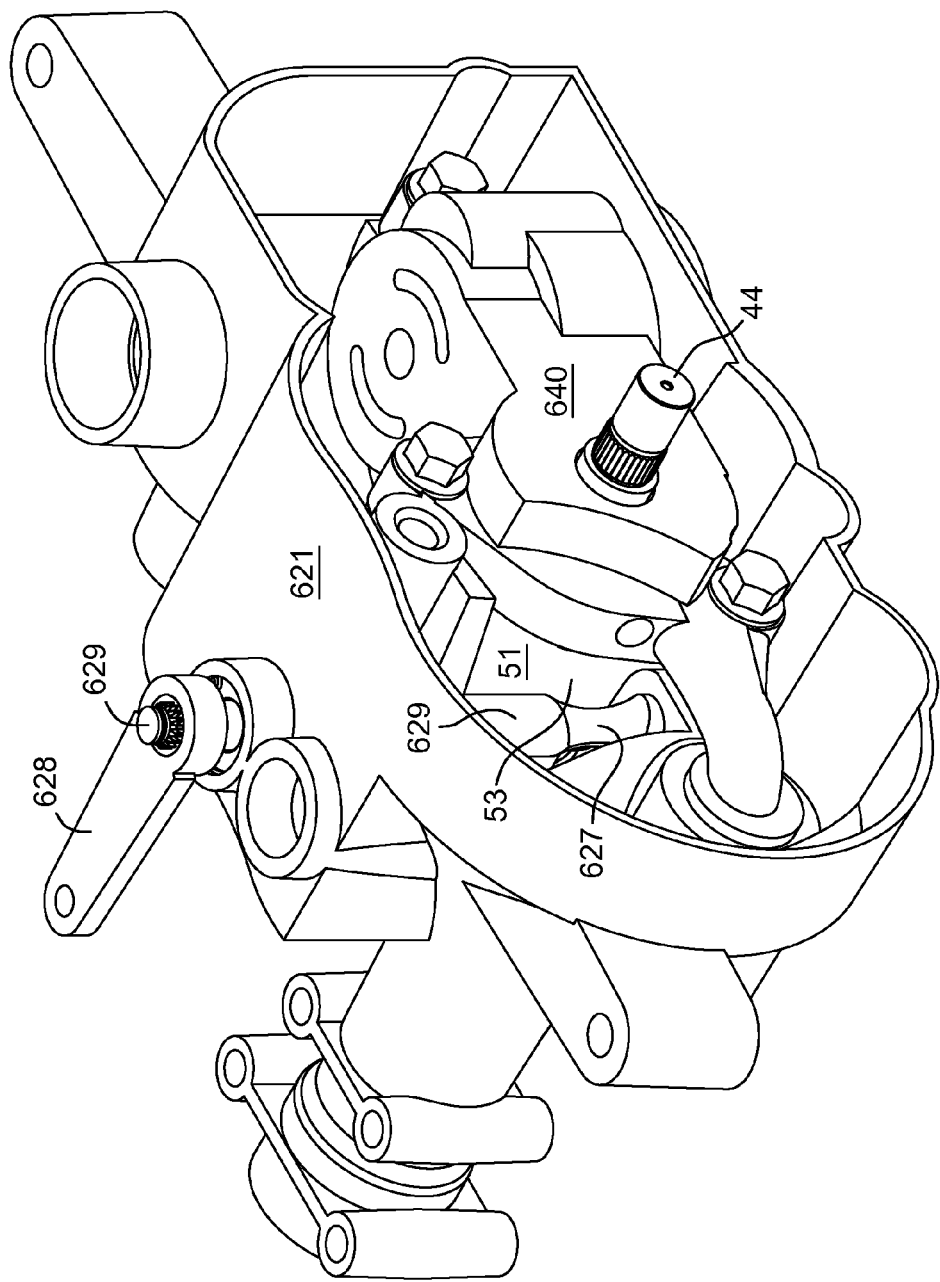
FIG. 33 is a perspective view of a portion of a second embodiment of a brake mechanism for use in hydrostatic transaxle in accordance with this invention.
Figure 34:
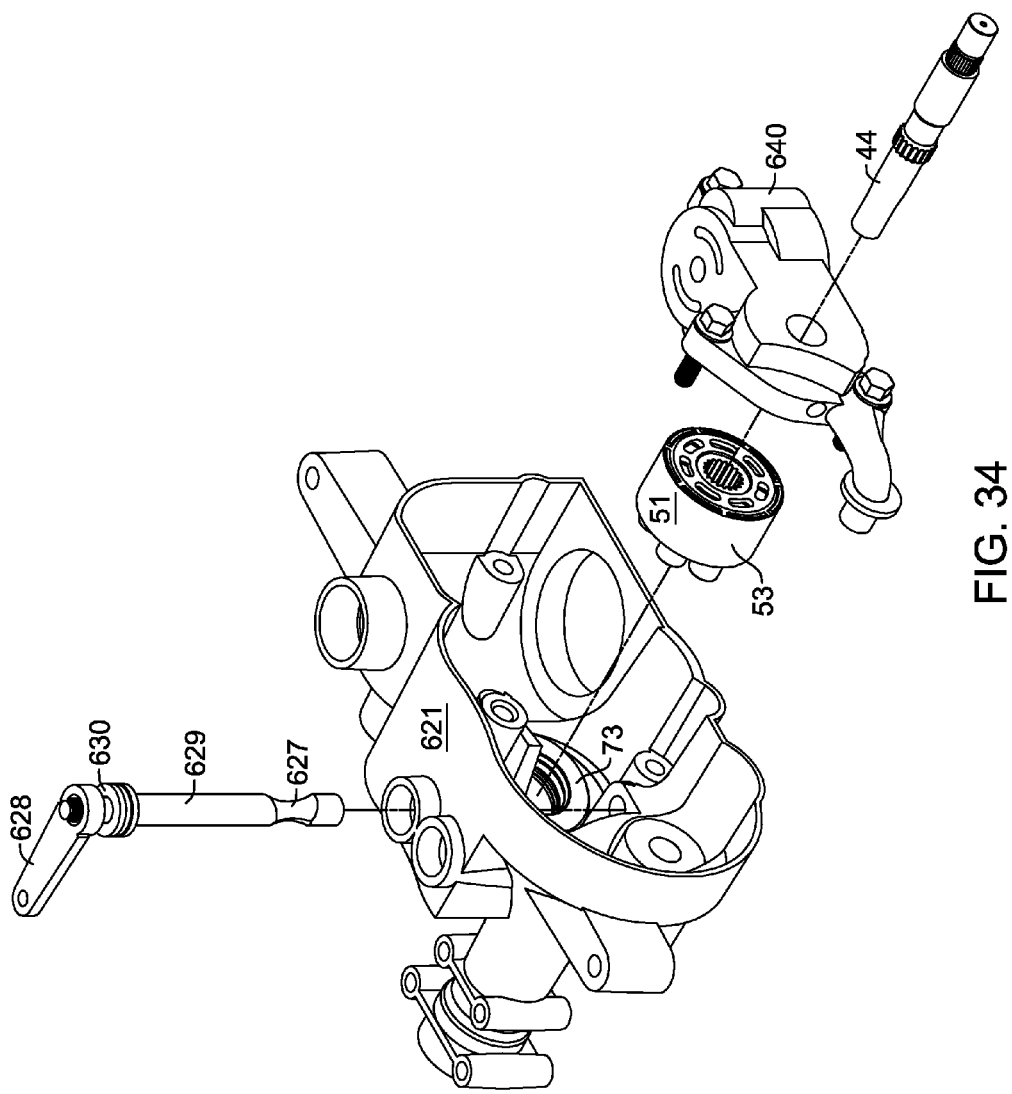
FIG. 34 is an exploded perspective view of the transaxle components shown in FIG. 33.
Figure 35:
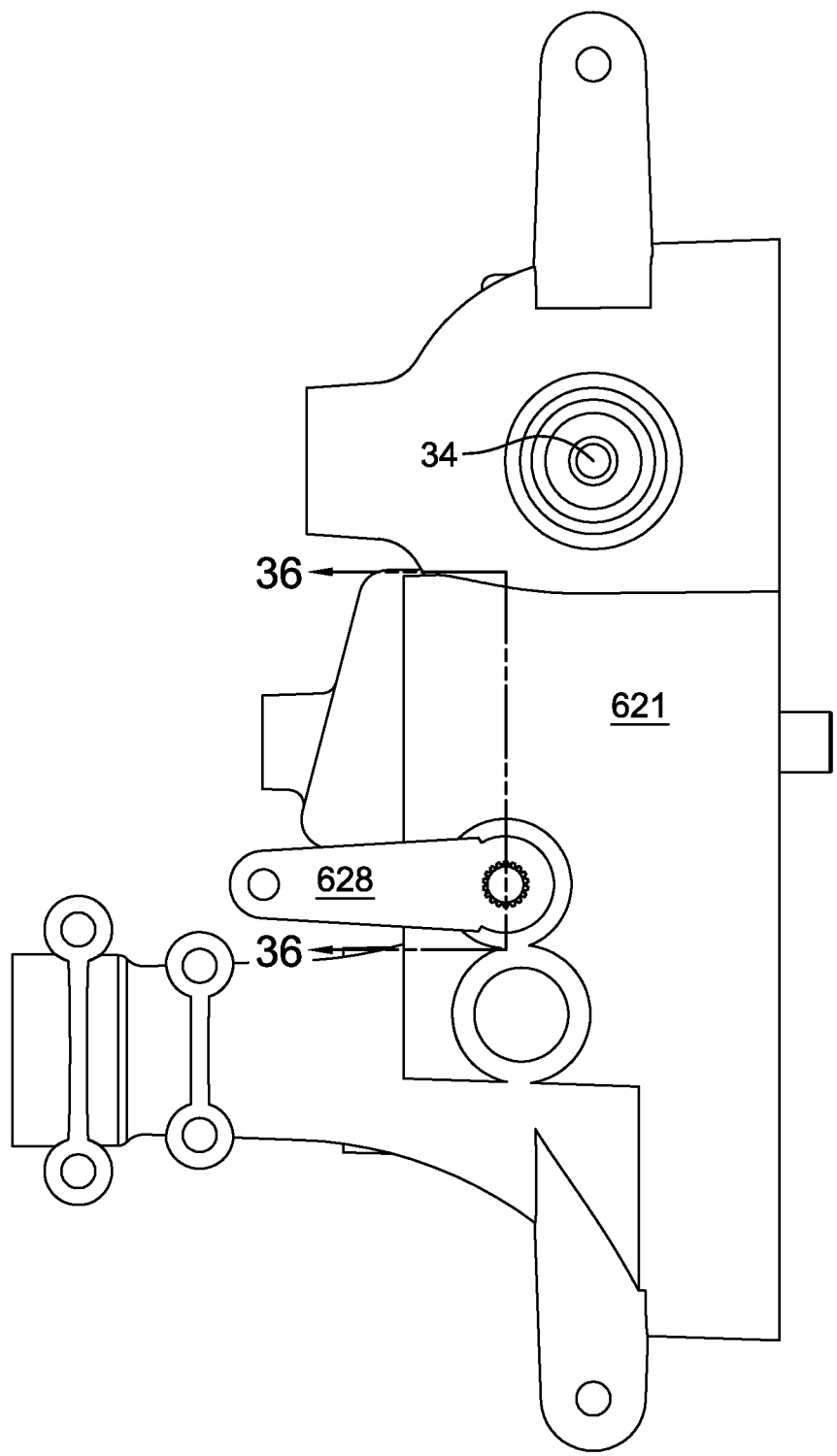
FIG. 35 is a top plan view of a portion of the external housing and certain components of the transaxle shown in FIG. 33.
Figure 38:
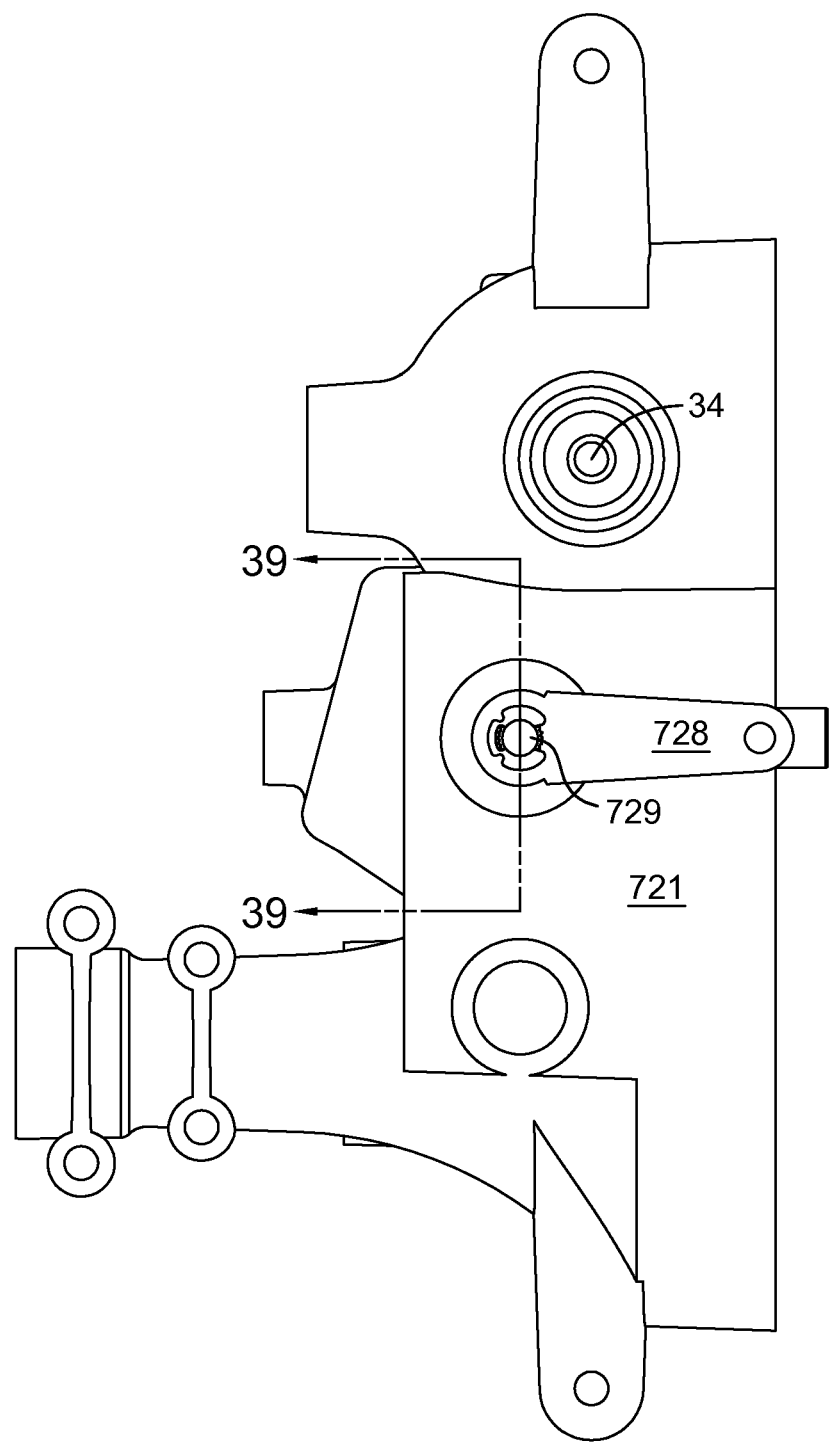
FIG. 38 is a top plan view of a portion of the external housing and certain components of a third embodiment of a brake mechanism for use in a hydrostatic transaxle in accordance with this invention.
Figure 42:
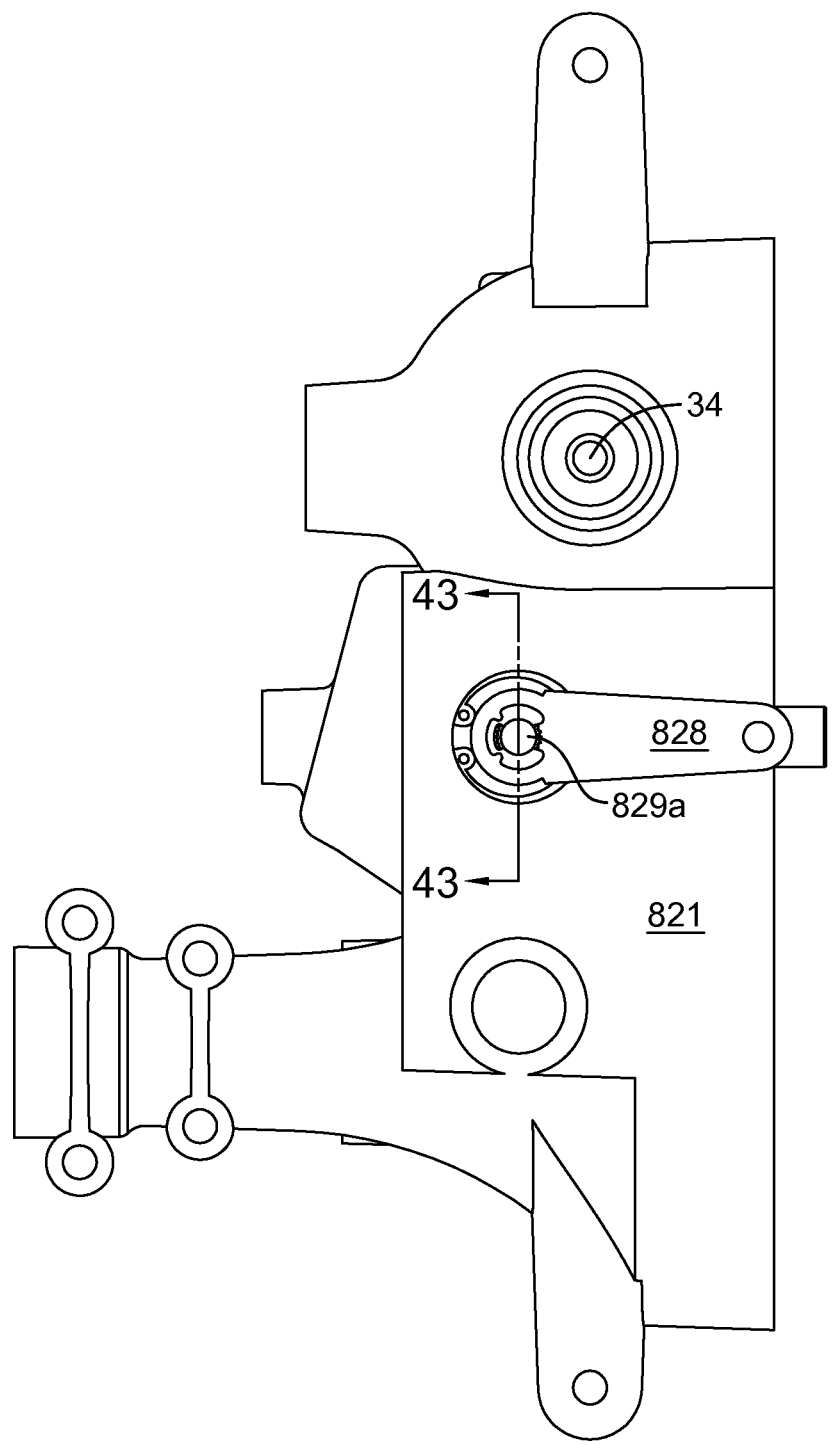
FIG. 42 is a top plan view of a portion of the external housing and certain components of a fourth embodiment of a brake mechanism for use in a hydrostatic transaxle in accordance with this invention.
Figure 44:
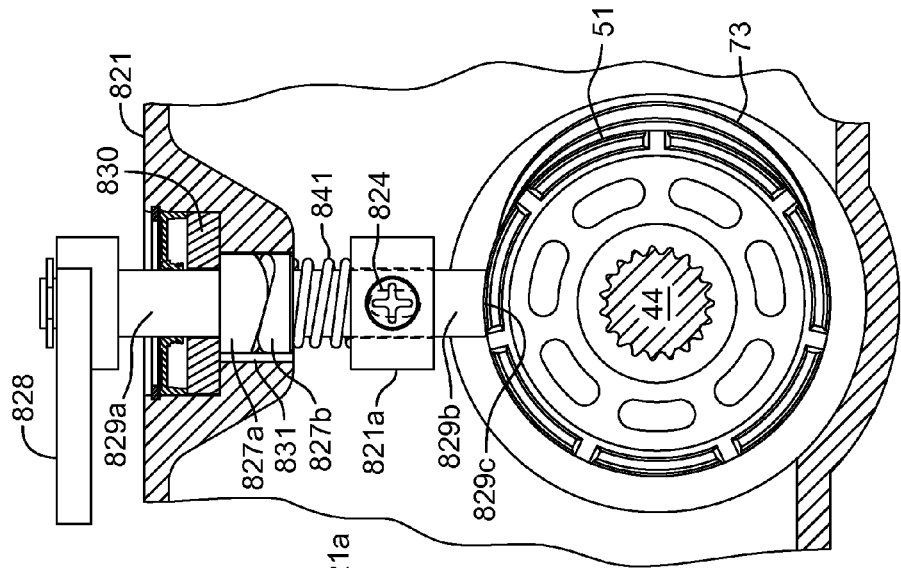
FIG. 44 is a cross-sectional side view identical to FIG. 43 but with the brake mechanism in the engaged position.
Figure 45:
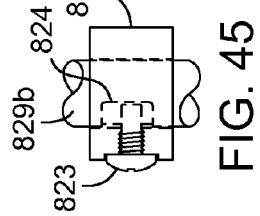
FIG. 45 is a side view of a portion of the braking mechanism shown in FIG. 44 and along the lines 45-45 in FIG. 43.
Figure 43:
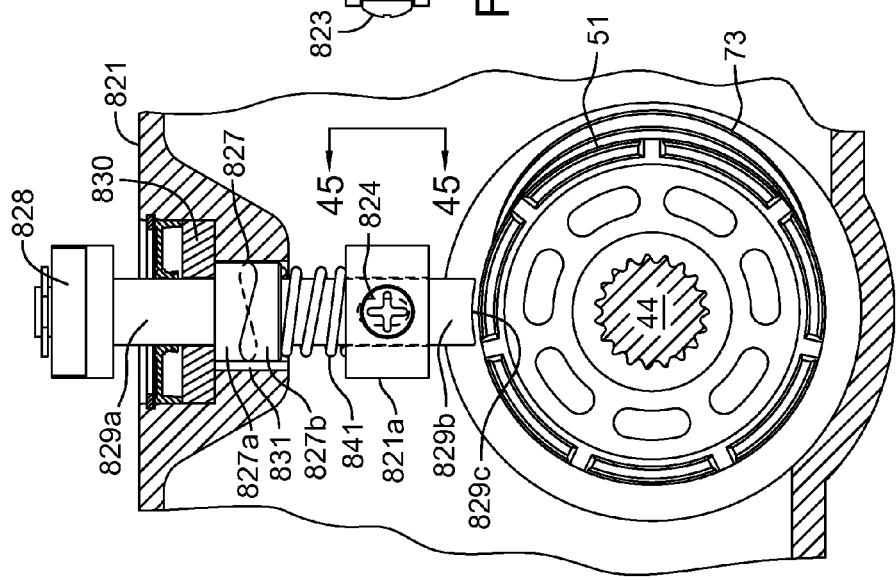
FIG. 43 is a cross-sectional side view along the lines 43-43 in FIG. 42, with the brake mechanism in the disengaged position.

A further alternative embodiment of a center section and check plug design is shown in FIG. 32, which depicts center section 540 having a pair of check plugs 474 mounted therein. A charge cover 575 is secured to housing 521 or center section 540 by fasteners 597 adjacent check valve openings 578 in center section 540. A manifold 580 is formed as a part of charge cover 575. As with prior embodiments, input shaft 534 drives both pump cylinder block 41 and gerotor charge pump 91. Here, a charge inlet 576 and charge outlet 577 are formed directly in the bottom of center section 540. One of the benefits of this embodiment is that charge cover 575 acts to retain check plugs 474 in center section 540, eliminating the need for multiple components.

While specific embodiments of the invention have been described in detail, it will be appreciated by those skilled in the art that various modification and alternatives to those details could be developed in light of the overall teachings of the disclosure. Accordingly, the particular arrangements of the embodiments disclosed are meant to be illustrative only and not limiting as to the scope of the invention which is to be given the full breadth of the appended claims and any equivalents thereof.

The invention claimed is:

1. A drive apparatus, comprising:
a housing forming a sump having a hydraulic pump disposed therein;
a center section disposed in the housing and comprising a hydraulic circuit for connecting the hydraulic pump to a hydraulic motor and a pump running surface on which the hydraulic pump is rotatably disposed and connected to the hydraulic circuit;
a pair of cylindrical openings formed on a second surface of the center section opposite the pump running surface;
a first passage formed in the center section and connecting the pair of cylindrical openings;
a pair of check valves disposed in the center section and connected to respective sides of the hydraulic circuit, each one of the pair of check valves being accessible to one of the pair of cylindrical openings; and
a pair of caps disposed on the center section, each one of the pair of caps located in one of the pair of cylindrical openings, whereby the pair of caps close off a fluid gallery formed by the pair of cylindrical openings and the first passage, and the fluid gallery provides hydraulic fluid to the hydraulic circuit through the pair of check valves.

2. The drive apparatus of claim 1, wherein the pair of caps are retained in the pair of cylindrical openings by the proximity of the second surface of the center section to an internal surface of the housing.

3. The drive apparatus of claim 1, further comprising a charge pump disposed external to the housing and connected to the sump and to the fluid gallery.

4. The drive apparatus of claim 3, further comprising a second passage located in the housing and connecting the charge pump to the fluid gallery to provide charged fluid to the fluid gallery, and a third passage located in the housing and connecting the charge pump to the sump.

5. The drive apparatus of claim 4, wherein the second passage connects the charge pump directly to the first passage.

6. The drive apparatus of claim 4, further comprising a filter disposed external to the housing and connected between the third passage and the sump.

7. The drive apparatus of claim 4, wherein the second passage comprises a first charge pump plug disposed between the charge pump and the fluid gallery and the third passage comprises a second charge pump plug disposed between the charge pump and the sump, wherein hydraulic fluid passes through the first and second charge pump plugs by the pumping action of the charge pump.

8. The drive apparatus of claim 4, wherein the second passage comprises a first tube disposed between the charge pump and the fluid gallery and wherein the third passage comprises a second tube disposed between the charge pump and the sump, wherein each tube has a flexible ring located at each of its opposing ends to retain one end of each tube in the center section and the opposite end of each tube in the housing.

9. The drive apparatus of claim 8, wherein the charge pump comprises a charge pump cover having a projection that engages the first and second tubes to further retain the first and second tubes in place.

10. The drive apparatus of claim 1, further comprising a charge relief passage formed in the center section and connected to the hydraulic circuit to permit oil to exit the fluid gallery to the sump when pressure in the fluid gallery exceeds a predetermined limit.

11. The drive apparatus of claim 10, wherein the charge relief passage has a longitudinal direction that is parallel to the first passage.

12. The drive apparatus of claim 10, wherein the charge relief passage has a side channel formed therein to permit hydraulic fluid to flow from the fluid gallery to the sump through the side channel.

13. The drive apparatus of claim 10, further comprising a ball valve and spring disposed in the charge relief passage to regulate flow from the fluid gallery to the sump, and further comprising a boss formed on an internal surface of the housing to retain the spring in place.

14. The drive apparatus of claim 10, further comprising a ball valve and spring disposed in the charge relief passage to regulate the flow from the fluid gallery to the sump, and further comprising a pin pressed into the center section to retain the spring in place.

15. A drive apparatus, comprising:
a housing forming a sump having a hydraulic pump and a hydraulic motor mounted therein;
a center section disposed in the housing and comprising a hydraulic circuit formed therein for connecting the hydraulic pump to the hydraulic motor, a pump running surface on which the hydraulic pump is rotatably disposed and connected to the hydraulic circuit, and a motor running surface on which the hydraulic motor is rotatably disposed and connected to the hydraulic circuit;
a pair of cylindrical openings formed on a third surface of the center section opposite the pump running surface;
a first passage formed in the center section and connecting the pair of cylindrical openings, wherein the first passage and the pair of cylindrical openings form a fluid gallery to provide hydraulic fluid to the hydraulic circuit;
a charge pump disposed external to the housing and connected to the sump and to the fluid gallery; and
a pair of check valves disposed in the center section and connected to respective sides of the hydraulic circuit, each one of the pair of check valves being accessible to one of the pair of cylindrical openings to provide hydraulic fluid to the hydraulic circuit from the fluid gallery.

16. The drive apparatus of claim 15, further comprising a pair of caps disposed on the center section, each one of the pair of caps located in one of the pair of cylindrical openings, whereby the pair of caps close off the fluid gallery.

17. The drive apparatus of claim 16, whereby the pair of caps are retained in the pair of cylindrical openings by the proximity of the third surface of the center section to an internal surface of the housing.

18. The drive apparatus of claim 15, further comprising a second passage located in the housing and connecting the charge pump to the fluid gallery to provide charged fluid to the fluid gallery, and a third passage formed in the housing and connecting the charge pump to the sump.

19. The drive apparatus of claim 15, further comprising a charge relief passage formed in the center section and connected to the hydraulic circuit to permit oil to exit the fluid gallery to the sump when pressure in the fluid gallery exceeds a predetermined limit, wherein the charge relief passage has a longitudinal direction that is parallel to the first passage.

20. The drive apparatus of claim 19, wherein the charge relief passage has a side channel formed therein to permit hydraulic fluid to flow from the fluid gallery to the sump through the side channel.

21. The drive apparatus of claim 19, further comprising a ball valve and spring disposed in the charge relief passage to regulate flow from the fluid gallery to the sump, and further comprising a pin pressed into the center section to retain the spring in place.

22. A drive apparatus, comprising:
a housing comprising a main housing and a side housing jointed together to form an internal sump;
a center section disposed in the internal sump and comprising a hydraulic circuit formed therein for connecting a hydraulic pump to a hydraulic motor;
a fluid gallery disposed at least partially in the center section for storing hydraulic fluid for the hydraulic circuit, the fluid gallery being operatively connected to a charge pump;
a pair of check valves disposed in the center section and connected to respective sides of the hydraulic circuit to provide hydraulic fluid to the hydraulic circuit from the fluid gallery;
a charge pump disposed external to the housing and connected to the sump and to the fluid gallery;
a charge relief passage formed in the center section and connected to the internal sump to permit oil to exit the fluid gallery to the internal sump when pressure in the fluid gallery exceeds a predetermined limit;
a relief valve and a spring disposed in the charge relief passage to regulate flow from the fluid gallery to the internal sump; and
a retention mechanism engaged to the spring to retain the spring in place.

23. The drive apparatus of claim 22, wherein the retention mechanism comprises a pin pressed into the center section.

24. The drive apparatus of claim 22, wherein the relief valve comprises a ball valve.

25. The drive apparatus of claim 22, wherein the charge relief passage has a side channel formed therein to permit hydraulic fluid to flow from the fluid gallery to the internal sump through the side channel.

* * * * *